US007046832B1

(12) United States Patent
Barbour

(10) Patent No.: US 7,046,832 B1
(45) Date of Patent: May 16, 2006

(54) IMAGING OF SCATTERING MEDIA USING RELATIVE DETECTOR VALUES

(75) Inventor: Randall L. Barbour, Glen Head, NY (US)

(73) Assignee: The Research Foundation of State Univ. of New York, Albany, NY (US)

(*) Notice: Subject to any disclaimer, the term of this patent is extended or adjusted under 35 U.S.C. 154(b) by 409 days.

(21) Appl. No.: 10/088,192

(22) PCT Filed: Sep. 14, 2000

(86) PCT No.: PCT/US00/25156

§ 371 (c)(1),
(2), (4) Date: Mar. 14, 2002

(87) PCT Pub. No.: WO01/20546

PCT Pub. Date: Mar. 22, 2001

Related U.S. Application Data

(60) Provisional application No. 60/153,769, filed on Sep. 14, 1999, provisional application No. 60/153,926, filed on Sep. 14, 1999, provisional application No. 60/154,099, filed on Sep. 15, 1999.

(51) Int. Cl.
*G06K 9/00* (2006.01)
(52) U.S. Cl. ...................................... 382/131

(58) Field of Classification Search ................ 382/128, 382/131, 132, 191, 305; 356/432; 250/341.1; 600/476
See application file for complete search history.

(56) References Cited

U.S. PATENT DOCUMENTS

| | | | |
|---|---|---|---|
| 5,477,051 A | 12/1995 | Tsuchiya | 250/341.1 |
| 5,625,458 A | 4/1997 | Alfano et al. | 382/128 |
| 5,903,357 A | 5/1999 | Colak | 356/432 |
| 5,963,658 A | 10/1999 | Klibanov et al. | 384/128 |
| 6,104,946 A | 8/2000 | Tsuchiya et al. | 600/476 |

*Primary Examiner*—Vikkram Bali
(74) *Attorney, Agent, or Firm*—Scully, Scott, Murphy & Presser

(57) ABSTRACT

A method and system for imaging of a scattering target medium using a modified perturbation formulation of a radiation transport equation where normalized measured values are used to recover a relative difference in absorption and/or scattering properties based on the normalized measured values with respect to a reference medium. The modified perturbation formulation provides enhanced stability, reduces the sensitivity of solution to variations between the target and reference media, produces solutions having physical units and reduces the need for absolute detector calibration. Moreover, the modified perturbation equation lends itself to the detection and imaging of dynamic properties of the scattering medium.

17 Claims, 25 Drawing Sheets

| Test Case | | The Parameters Involved | | | | | Inverse | Result |
|---|---|---|---|---|---|---|---|---|
| # | Formulation | I | $I_0$ | $I_r$ | $W_r$ | $\beta$ | Algorithms | Presented |
| 1 | $W_r \delta x = \left(\dfrac{I - I_0}{I_0}\right) I_r$ | C | C | V | V | / | CGD | 6x6 Matrix |
| 2 | $W_r \delta x = \left(\dfrac{I - I_0}{I_0}\right) I_r$ | C | C | V | V | / | CGD + WMR | 6x6 Matrix |
| 3 | $W_r \delta x = I - I_r$ | C | / | V | V | / | CGD | 5x5 Matrix |
| 4 | $W_r \delta x = I - I_r$ | C | / | V | V | / | CGD + WMR | 5x5 Matrix |
| 5 | $W_r \delta x = I - I_b$ | C | / | C | V | / | CGD | 6x6 Matrix |
| 6 | $W_b \delta x = I - I_r$ | C | / | V | C | / | CGD | 5x5 Matrix |
| 7 | $W_b \delta x = \beta I - I_b$ | C | / | C | C | V | CGD | 3x3 Matrix |

FIG. 3

Constant Calibration Errors

| -50% | -10% | 0% |
|---|---|---|
| 10% | 25% | 50% |
| 100% | 200% | 900% |

FIG. 10

| | Ua | | | | | | D | | | | |
|---|---|---|---|---|---|---|---|---|---|---|---|
| | Image RSME | | | | | | Image RSME | | | | |
| 1.2024 | 1.0805 | 1.0229 | 1.0113 | 1.0048 | 1.0036 | 3.4978 | 1.8461 | 0.7665 | 0.6061 | 0.6689 | 0.7096 |
| 0.6449 | 0.5520 | 0.5181 | 0.5089 | 0.5023 | 0.5010 | 2.5947 | 1.0714 | 0.1394 | 0.3617 | 0.6149 | 0.6787 |
| 0.2055 | 0.0881 | 0.0791 | 0.0861 | 0.0910 | 0.0917 | 2.3307 | 0.9784 | 0.1396 | 0.3682 | 0.6188 | 0.6825 |
| 1.4762 | 1.5126 | 1.5330 | 1.5369 | 1.5385 | 1.5386 | 2.1879 | 0.9450 | 0.1638 | 0.3823 | 0.6260 | 0.6876 |
| 4.0360 | 4.0585 | 4.0677 | 4.0677 | 4.0690 | 4.0690 | 2.0802 | 0.9036 | 0.1742 | 0.3924 | 0.6289 | 0.6897 |
| 6.5828 | 6.5959 | 6.6002 | 6.6002 | 6.6005 | 6.6005 | 1.9768 | 0.8595 | 0.1795 | 0.3980 | 0.6305 | 0.6909 |
| | Object Contrast | | | | | | Object Contrast | | | | |
| | (True Contrast Value = 0.02 cm$^{-1}$) | | | | | | (True Contrast Value = 0.0332 cm$^{-1}$) | | | | |
| 0.1418 | 0.0849 | 0.0425 | 0.0284 | 0.0170 | 0.0142 | 0.4091 | 0.2444 | 0.1222 | 0.0819 | 0.0491 | 0.0410 |
| 0.0899 | 0.0425 | 0.0132 | 0.0066 | 0.0025 | 0.0017 | 0.2466 | 0.1155 | 0.0341 | 0.0165 | 0.0064 | 0.0048 |
| 0.0639 | 0.0262 | 0.0076 | 0.0035 | 0.0008 | 0.0005 | 0.1723 | 0.0675 | 0.0189 | 0.0096 | 0.0029 | 0.0021 |
| 0.0315 | 0.0121 | 0.0020 | 0.0007 | 0.0001 | 0.0000 | 0.0779 | 0.0313 | 0.0071 | 0.0036 | 0.0004 | 0.0003 |
| 0.0141 | 0.0037 | 0.0004 | 0.0001 | 0.0000 | 0.0000 | 0.0431 | 0.0133 | 0.0031 | 0.0006 | 0.0001 | 0.0001 |
| 0.0063 | 0.0017 | 0.0001 | 0.0000 | 0.0000 | 0.0000 | 0.0219 | 0.0098 | 0.0009 | 0.0002 | 0.0000 | 0.0000 |
| | Edge Resolution | | | | | | Edge Resolution | | | | |
| | (Actual FWHM = 1 cm) | | | | | | (Actual FWHM = 1 cm) | | | | |
| 1.2656 | 1.2656 | 1.2656 | 1.2656 | 1.2656 | 1.2656 | 1.1707 | 1.1707 | 1.1707 | 1.1707 | 1.1707 | 1.1707 |
| 1.3922 | 1.5187 | 1.6137 | 1.7402 | 2.0250 | 2.0566 | 1.2340 | 1.2978 | 1.2973 | 1.3605 | 1.6137 | 1.6453 |
| 1.5504 | 1.6137 | 1.8035 | 2.0566 | 2.1832 | 1.5187 | 1.2973 | 1.2973 | 1.4238 | 1.6453 | 1.3605 | 1.1074 |
| 1.7402 | 2.0250 | 2.1832 | 2.1832 | 1.1391 | 1.0441 | 1.3605 | 1.6137 | 1.3605 | 1.2973 | 0.9809 | 0.9492 |
| 2.1516 | 2.0883 | 1.3289 | 1.0441 | 0.6328 | 0.6645 | 1.6453 | 1.3605 | 1.2023 | 0.9492 | 0.6012 | 0.6645 |
| 2.1832 | 1.3605 | 1.0441 | 0.6328 | 0.6645 | 0.3480 | 1.3605 | 1.2656 | 0.9492 | 0.3480 | 0.6328 | 0.2215 |

| Ua | | | | | | D | | | | | |
|---|---|---|---|---|---|---|---|---|---|---|---|
| Image RSME | | | | | | Image RSME | | | | | |
| 1.1171 | 1.0615 | 1.0272 | 1.0173 | 1.0100 | 1.0082 | 2.9455 | 1.4274 | 0.4252 | 0.3957 | 0.5926 | 0.6555 |
| 0.5662 | 0.5251 | 0.5061 | 0.5029 | 0.5020 | 0.5019 | 2.6397 | 1.1522 | 0.1382 | 0.3447 | 0.6095 | 0.6763 |
| 0.1143 | 0.0560 | 0.0511 | 0.0586 | 0.0598 | 0.0748 | 2.4602 | 1.0394 | 0.1042 | 0.3594 | 0.6135 | 0.6750 |
| 1.4935 | 1.5003 | 1.5152 | 1.5359 | 1.5373 | 1.5350 | 2.2413 | 0.9426 | 0.1317 | 0.3578 | 6.9283 | 15.892 |
| 4.0029 | 4.0296 | 4.0678 | 4.0614 | 4.0810 | 4.6830 | 2.0733 | 0.9074 | 2.9287 | 23.021 | 59.515 | 66.122 |
| 6.5353 | 6.5962 | 6.5889 | 6.5719 | 9.4904 | 24.8398 | 1.9857 | 1.0638 | 30.856 | 58.531 | 73.635 | 78.807 |
| Object Contrast (True Contrast Value = 0.02 $cm^{-1}$) | | | | | | Object Contrast (True Contrast Value = 0.0332 $cm^{-1}$) | | | | | |
| 0.0017 | 0.0010 | 0.0005 | 0.0003 | 0.0002 | 0.0002 | 0.3790 | 0.2274 | 0.1137 | 0.0758 | 0.0455 | 0.0379 |
| 0.0044 | 0.0053 | 0.0078 | 0.0089 | 0.0105 | 0.0111 | 0.2697 | 0.1377 | 0.0474 | 0.0239 | 0.0088 | 0.0056 |
| 0.0127 | 0.0157 | 0.0199 | 0.0221 | 0.0153 | 0.0105 | 0.2035 | 0.0938 | 0.0281 | 0.0112 | 0.0057 | 0.0051 |
| 0.0446 | 0.0531 | 0.0376 | 0.0056 | 0.0004 | 0.0017 | 0.1138 | 0.0419 | 0.0142 | 0.0106 | 0.0141 | 0.6339 |
| 0.1072 | 0.0724 | 0.0003 | 0.0035 | 0.0001 | 0.0002 | 0.0503 | 0.0277 | 0.0145 | 1.9047 | 6.4243 | 6.8546 |
| 0.1169 | 0.0080 | 0.0044 | 0.0015 | 0.0050 | 0.1918 | 0.0433 | 0.0289 | 2.4170 | 6.2687 | 7.6970 | 8.7233 |
| Edge Resolution (Actual FWHM = 1 cm) | | | | | | Mean FWHM (Actual FWHM = 1 cm) | | | | | |
| 3.2590 | 3.2590 | 3.2590 | 3.2590 | 3.2590 | 3.2590 | 0.7594 | 0.7594 | 0.7594 | 0.7594 | 0.7594 | 0.7594 |
| 0.5062 | 0.6012 | 0.6328 | 0.6961 | 0.6328 | 0.6328 | 0.7594 | 0.7594 | 0.7910 | 0.7594 | 0.7594 | 0.4746 |
| 0.5379 | 0.6328 | 0.6645 | 0.6328 | 0.5062 | 0.4113 | 0.7910 | 0.7910 | 0.8227 | 0.4746 | 0.4113 | 0.3797 |
| 0.6961 | 0.6328 | 0.4430 | 0.3797 | 0.1582 | 0.2531 | 0.7594 | 0.7277 | 0.4113 | 0.4113 | 0.2215 | 1.8035 |
| 0.6012 | 0.4746 | 2.8477 | 0.2531 | 0.1898 | 0.1898 | 0.4746 | 0.3797 | 0.1898 | 0.3480 | 3.0059 | 3.0059 |
| 0.5062 | 0.4113 | 0.2215 | 0.1898 | 0.3797 | 0.0949 | 0.3797 | 0.3164 | 0.3797 | 3.0059 | 3.0059 | 3.4488 |

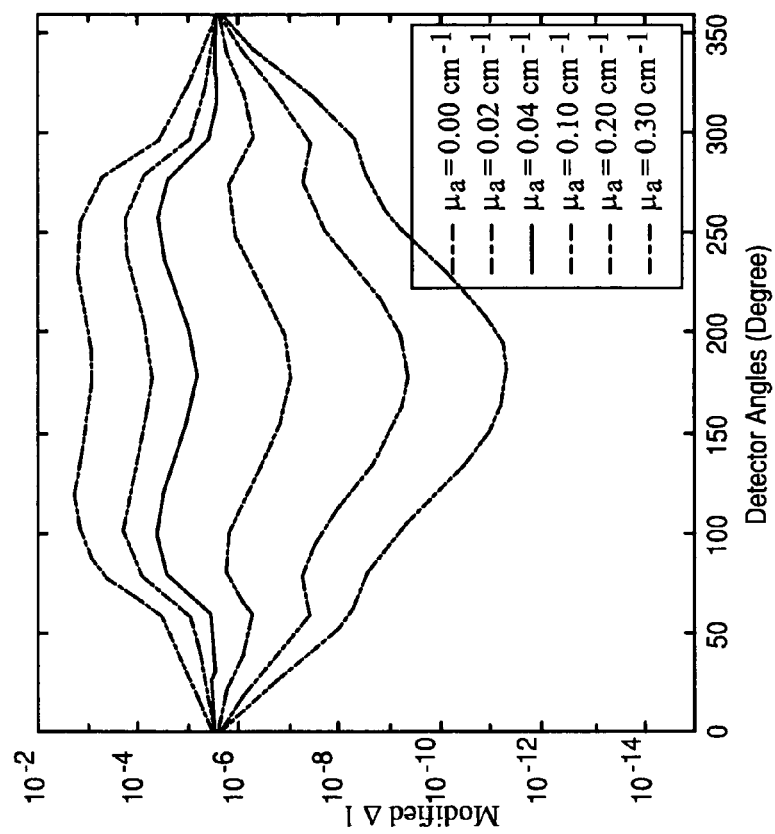
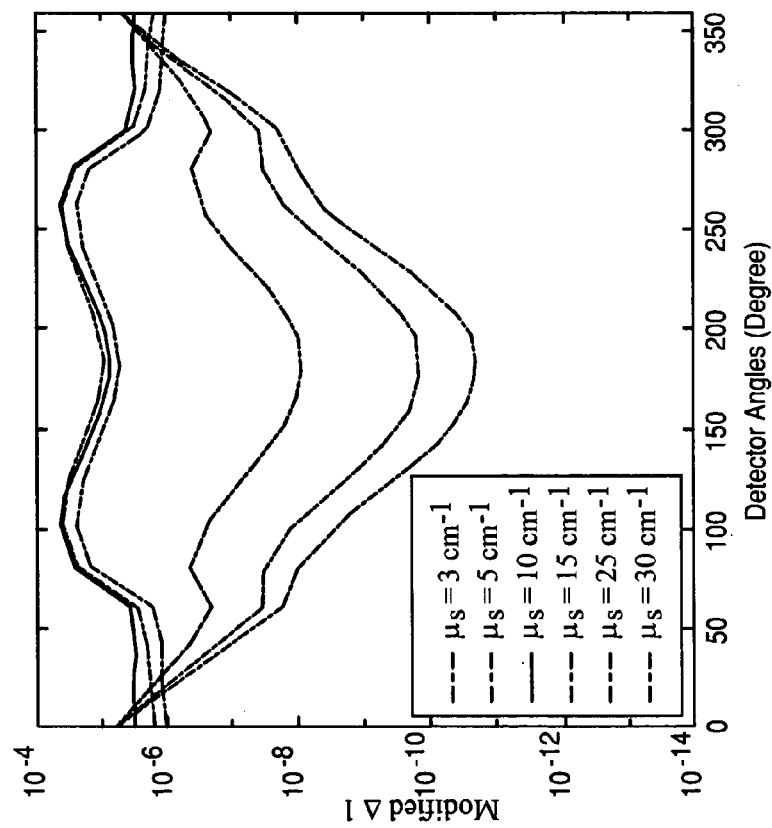
FIG. 17A
FIG. 17B

Original ratio = $\delta\mu/\delta D = 0.02/0.0332 = 0.6024$
$(\delta\mu_4/\delta D)^{1/2} = 0.3626$ $\mu_2(cm^{-1})$

| $\mu_2(cm^{-1})$ | 7 | 5 | 10 | 15 | 25 | 30 |
|---|---|---|---|---|---|---|
| 0.00 | 0.3427 | 0.3435 | 0.3441 | 0.3429 | 0.3427 | 0.3429 |
| 0.02 | 0.3627 | 0.3682 | 0.3882 | 0.4000 | 0.3846 | 0.3469 |
| 0.04 | 0.3715 | 0.3887 | 0.4042 | 0.3608 | 0.2758 | 0.2380 |
| 0.10 | 0.4048 | 0.3817 | 0.2816 | 0.1891 | 0.2000 | 0.0000 |
| 0.20 | 0.3463 | 0.2761 | 0.1212 | 0.1428 | 0.0000 | 0.0000 |
| 0.30 | 0.2863 | 0.1683 | 0.1000 | 0.0000 | -NAN | -NAN |

FIG. 19

IMAGING OF SCATTERING MEDIA USING RELATIVE DETECTOR VALUES

This application claims the benefit under 35 U.S.C. §120 of prior U.S. Provisional Patent Application Ser. Nos. 60/153,769 filed Sep. 14, 1999, entitled TOMOGRAPHY IN A SCATTERING MEDIUM, 60/153,926 filed Sep. 14, 1999, entitled DYNAMIC TOMOGRAPHY IN A SCATTERING MEDIUM and 60/154,099 filed Sep. 15, 1999, entitled DYNAMIC TOMOGRAPHY IN A SCATTERING MEDIUM.

This application is related to copending application Ser. No. 10/088,254, issued as U.S. Pat. No. 6,795,195 on Sep. 21, 2004, filed on the same date as this application, entitled "SYSTEM AND METHOD FOR TOMOGRAPHIC IMAGING OF DYNAMIC PROPERTIES OF A SCATTERING MEDIUM" by inventors R. Barbour and C. Schmitz and is hereby incorporated by reference (hereinafter the "Barbour 4147PC1 application").

This application is also related to copending application Ser. No. 10/088,190, filed on the same date as this application, entitled "METHOD AND SYSTEM FOR IMAGING THE DYNAMICS OF A SCATTERING MEDIUM" by inventor R. Barbour and is hereby incorporated by reference (hereinafter the "Barbour 4147PC2 application").

This invention was made with U.S. Government support under contract number CA-RO166184-02A, awarded by the National Cancer Institute. The U.S. Government has certain rights in the invention.

FIELD OF THE INVENTION

The invention relates generally to imaging in a scattering medium, and more particularly, to a method using a novel modification to the perturbation formulation of the radiation transport inverse problem to determine relative changes in the absorption and/or scattering properties of the medium based on relative changes in measured energy.

BACKGROUND OF THE INVENTION

Many techniques and systems have been developed to image the interior structure of a turbid medium through the measurement of energy that becomes scattered upon being introduced into a medium. Typically, a system for imaging based on scattered energy detection includes a source for directing energy into a target medium and a plurality of detectors for measuring the intensity of the scattered energy exiting the target medium at various locations with respect to the source. Based on the measured intensity of the energy exiting the target medium, it is possible to reconstruct an image representing the cross-sectional scattering and/or absorption properties of the target. Exemplary methods and systems are disclosed in Barbour et al., U.S. Pat. No. 5,137,355, entitled "Method of Imaging a Random Medium," (hereinafter the "Barbour '355 patent"), Barbour, U.S. Pat. No. 6,081,322, entitled "NIR Clinical Opti-Scan System," (hereinafter the "Barbour '322 patent"), the Barbour 4147PC1 application, and the Barbour 4147PC2 application.

Imaging techniques based on the detection of scattered energy are capable of measuring the internal absorption, scattering and other properties of a medium using sources whose penetrating energy is highly scattered by the medium. Accordingly, these techniques permit the use of wavelengths and types of energy not suitable for familiar transmission imaging techniques. Thus they have great potential for detecting properties of media that are not accessible to traditional energy sources used for transmission imaging techniques. For example, one flourishing application of imaging in scattering media is in the field of optical tomography. Optical tomography permits the use of near infrared energy as an imaging source. Near infrared energy is highly scattered by human tissue and is therefore an unsuitable source for transmission imaging in human tissue. However, these properties make it a superior imaging source for scattering imaging techniques. The ability to use near infrared energy as an imaging source is of particular interest in clinical medicine because it is exceptionally responsive to blood volume and blood oxygenation levels, thus having great potential for detecting cardiovascular disease, tumors and other disease states.

A common approach for the reconstruction of an image of the cross-sectional properties of a scattering medium is to solve a perturbation equation based on the radiation transport equation. The radiation transport equation is a mathematical expression describing the propagation of energy through a scattering medium. The perturbation formulation relates the difference between coefficient values of the true target and a specified reference medium, weighted by a proportionality coefficient whose value depends on, among other things, the source/detector configuration and the optical properties of the medium. In practice, tomographic measurements consider some array of measurement data, thus forming a system of linear equations having the form $$u - u_r = \delta u = W_r \delta x, \qquad (1)$$

where $\delta u$ is the vector of differences between a set of measured light intensities (u) and those predicted for a selected reference medium ($u_r$), $W_r$ is the Jacobian operator, and $\delta x$ is the position-dependent difference between one or more optical properties of the target and reference media (i.e., a change in absorption coefficient $\delta \mu_a$, a change in the reduced scattering coefficient, $\mu'_s$, or, in the diffusion approximation, the diffusion coefficient $\delta D$, where $D=1/[3(\mu_a+\mu'_s)]$). The operator, referred to as the weight matrix, has coefficient values that physically represent the fractional change in light intensity at the surface caused by an incremental change in the optical properties at a specified point in the medium. Mathematically this is represented by the partial differential operator $\partial u_i/\partial x_j$, where i is related to the $i^{th}$ source/detector pairs at the surface of the medium, and j to the $j^{th}$ pixel or element in the medium.

Although the perturbation equation in Eq. (1) can be solved using any of a number of available inversion schemes, practical experience has shown that the accuracy and reliability of the results obtained can vary greatly due to uncertainties and errors associated with the quality of the measurement data, inaccuracies in the physical model describing light propagation in tissue, specification of an insufficiently accurate reference state, the existence of an inherently underdetermined state caused by insufficiently dense measurement sets, weak spatial gradients in the weight function, and so forth.

In practice, a matter of considerable concern is the accuracy with which the reference medium can be chosen. An accurate reference is one that closely matches the external geometry of the target medium, has the same size, nearly the same internal composition, and for which the locations of the measuring probes and their efficiency coincide well with those used in the actual measurements. While such conditions may be easily met in numerical and perhaps laboratory phantom studies, they represent a much greater challenge in the case of tissue studies. Confounding factors include the plasticity of tissue (it deforms upon probe contact), its mainly arbitrary external geometry and internal composition and the considerable uncertainty stemming from the expected variable coupling efficiency of light at the tissue surface. The influence of these uncertainties can be appreciated when it is recognized that the input data vector for the standard perturbation formulation (i.e., Eq. (1)) is actually the difference between a measured and a computed quantity. This vector contains information regarding the subsurface properties of the target medium that, in principle, can be extracted provided an accurate reference medium is available.

In practice, however, there are two significant concerns that are frequently encountered in experimental studies and are not easily resolvable especially in the case of tissue studies. One concern is the expected variable coupling efficiency of light entering and exiting tissue. Nonuniformity in the tissue surface, the presence of hair or other blemishes, its variable deformation upon contact with optical fibers, the expected variable reactivity of the vasculature in the vicinity of the measuring probe all serve to limit the ability to accurately determine the in-coupling and out-coupling efficiencies of the penetrating energy. Consideration of this issue is critical as variations in the coupling efficiency will be interpreted by the reconstruction methods as variations in properties of the target medium and can introduce gross distortions in the recovered images. In principle, the noted concern can be minimized by adopting absolute calibration schemes, however, in practice the variability in tissue surface qualities will limit reliability and stability of these efforts.

A second concern stems from the underlying physics of energy transport in highly scattering media. One effect of scattering is to greatly increase the pathlength of the propagating energy. Small changes in the estimated absorption or scattering properties of the medium can, depending on the distance separating the source and detector, greatly influence the density of emerging energy. This consideration has important implications regarding the required accuracy by which the reference medium must be specified. In the context of perturbation formulations, the reference medium serves to provide estimates of the predicted energy density as well as to provide the needed weight functions that serve as the imaging operators. The difficulty is that the computed reference intensity values are extremely dependent on the optical coefficient values of the reference medium. Significantly, this dependence is a nonlinear function of the distance between source and detector. It follows that a small change in the optical properties of the reference medium may influence the value of the computed intensity differences ($\delta u$) by a relative amount that may be significantly different for each source/detector pair, thereby altering the information content of the data vectors. This can lead to the recovery of grossly corrupted images. Whereas, in principle, such effects may be overcome by use of recursive solutions to the perturbation equation (i.e., Newton-type updates), in practice this can require extensive computational efforts, especially in the case of 3D solutions. Moreover, it is well appreciated that such efforts to improve on first order solutions to the perturbation equation (e.g., Born or Rytov solutions), can fail if the initial estimate chosen for the reference medium is insufficiently accurate.

One alternative to devising absolute calibration schemes is to devise methodologies whose solutions are intrinsically less sensitive, or better still, do not require such information, but nevertheless are capable of providing accurate descriptions of certain features of highly scattering media. While a range of empirical methodologies can be devised, it is desirable that they be broadly extendable without requiring undue physical approximations, since these are generally incompatible with model-based methods.

An approach previously adopted is to directly relate relative detector readings, obtained from comparison of detector values derived from two different target media (usually media with and without the included object), to the weight matrix computed based on a previously assigned reference medium. R. L. Barbour, H. Graber, R. Aronson, and J. Lubowsky, "Model for 3-D optical imaging of tissue," Int. Geosci. and Remote Sensing Symp., (IGARSS), 2, 1395–1399 (1990). While capable of producing good quality images of internal structure of a target medium, the method proved to have limited utility as it did not produce solutions having physical units, thereby rendering specific interpretation difficult, as well as limiting efforts to compute recursive solutions.

For the forgoing reasons, there is a need for image reconstruction techniques based on the detection of scattered energy that (1) do not require absolute calibration of, and absolute measurements by, the detectors and other elements of the apparatus, (2) make the standard perturbation equation less susceptible to variations between boundary conditions and properties of the reference medium and the target medium, and (3) produce solutions having physical units.

SUMMARY

The present invention satisfies these needs by providing a method for generating an image of a scattering medium using normalized relative measured intensity values a perturbation formulation based on the radiation transport equation.

It is an object of the present invention to provide a method for imaging the properties of a scattering target medium using a modified perturbation equation. The method comprises generating a first data vector of measured data from a target and a second vector of measured data from a target, normalizing the first and second vectors of measured data and solving a modified perturbation equation for the unknown optical properties of a target medium. The first and second vectors of measured data are measures of energy emerging from the target.

It is a further aspect of this invention to obtain the first and second sets of measured data from the same target, wherein the first set of measured data is a set of data measured at an instant in time and the second set of measured data is a time average mean of a plurality of first sets of measured data.

It is yet a further aspect of this invention to obtain the first and second sets of measured data from two different targets.

In another aspect of this invention the modified perturbation equation is a modified Rytov approximation. In another aspect of this invention the modified perturbation equation is a modified Born approximation.

BRIEF DESCRIPTION OF THE FIGURES

For a better understanding of the invention, together with the various features and advantages thereof, reference should be made to the following detailed description of the preferred embodiment and to the accompanying drawings, wherein:

FIG. 3 is a table illustrating a summary of the test cases explored;

FIG. 10 is a table listing constant calibration errors corresponding to each image of FIGS. 9A and 9B;

FIG. 11 is a table of data corresponding to the error, resolution and contrast for the reconstructed images shown in FIGS. 4A and B;

FIG. 12 is a table of data corresponding to the error, resolution and contrast for the reconstructed images shown in FIGS. 5A and B;

FIG. 17A is a graph plotting the amplitude of the relative intensities used in the standard perturbation formulation corresponding to the reconstructed cross-sectional images shown in row 3 of FIG. 5;

FIG. 17B is a graph plotting the amplitude of the relative intensities used in the standard perturbation formulation corresponding to the reconstructed cross-sectional images shown in column 3 of FIG. 5;

FIG. 19 is a table illustrating the ratio of average contrasts of reconstructed absorption and diffusion coefficients shown in FIGS. 4A and B respectively.

DETAILED DESCRIPTION OF THE INVENTION

Figure 1:
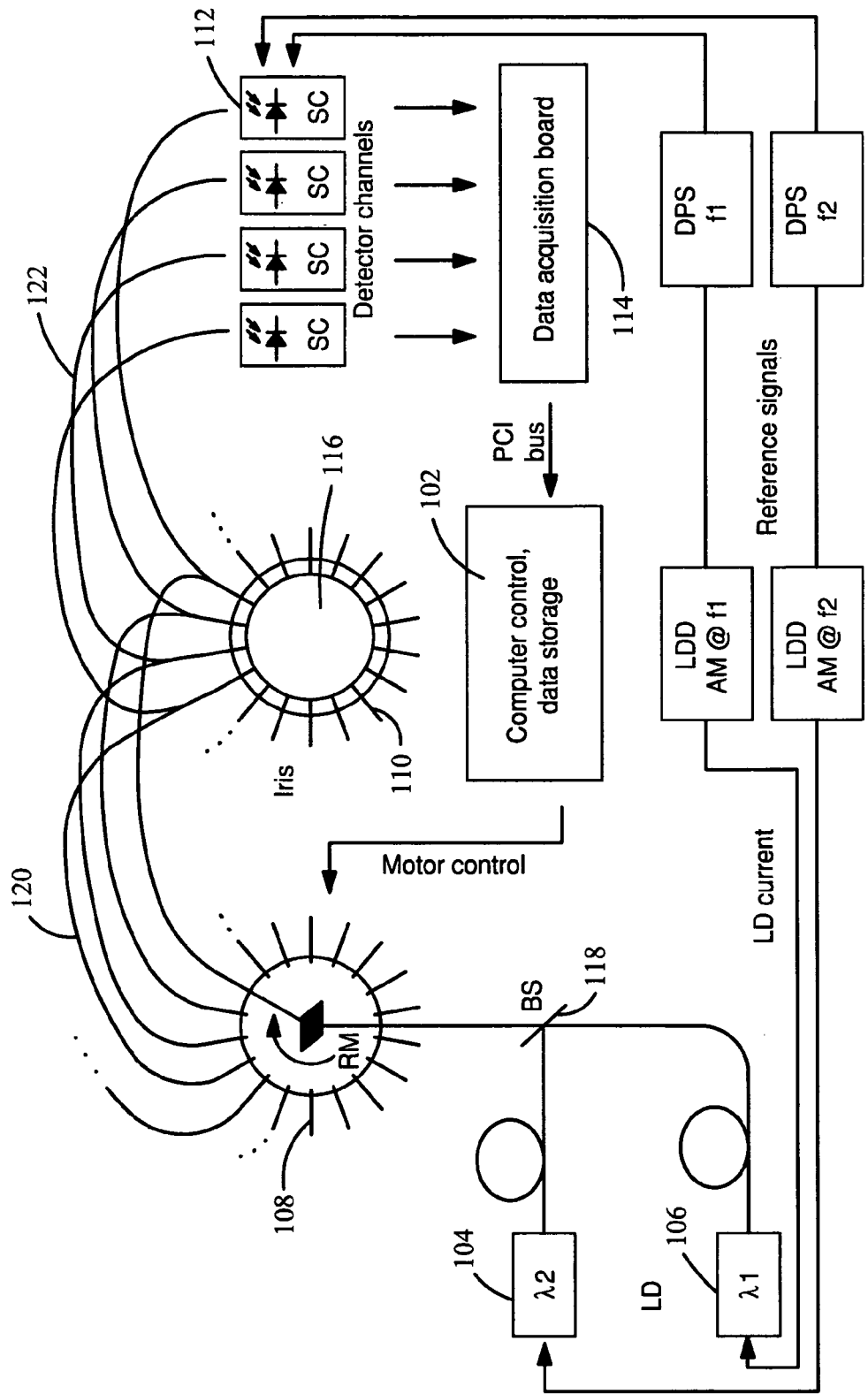
FIG. 1 is a schematic illustration of an exemplary imaging system.

Imaging in a scattering medium relates to the methods and techniques of image the internal properties of a medium based on the detection of scattered energy. The typical process for imaging of a scattering medium comprises: (1) selecting a reference medium having known boundary conditions and optical properties which are substantially similar to those of the intended target; (2) determining a weight matrix and an intensity of emerging energy exiting the reference medium at each of a plurality of source points for each of a plurality of detectors located around the reference medium boundary, the determination being made by either actual measurements or solution of the radiation transport equation; (3) measuring actual emerging energy intensities for corresponding source and detector points on a target medium; and (4) solving the perturbation equation for the optical properties of the target based on the measured intensities of energy emerging from the target.

The present invention describes an improved methodology for imaging of a scattering medium using a modified form of the standard perturbation equation. The inventive modification of the standard perturbation equation is capable of (1) reducing the sensitivity of the perturbation equation to differences between the reference medium and target medium, (2) producing solutions to the perturbation equation having physical units, and (3) reducing the effect of variable detector efficiencies without the need for absolute calibration, while at the same time preserving the ability to compute recursive solutions. Compared to the standard perturbation approach, the described invention provides remarkable improvement in the quality of image reconstruction.

While the method of the present invention is applicable to known static imaging techniques it is instrumental in the realization of practical dynamic imaging of highly scattering media. There are three principal elements to practical dynamic imaging. The first element is the development of a fast, parallel, multi-channel acquisition system that employs geometrically adaptive measuring heads. This system is described briefly below and in further detail in the copending Barbour 4147PC1 application. The second element is to evaluate the acquired tomographic data using the modified perturbation methods of the present invention. The third element is to collect a time series of data and subject either the time series of data or a time series of reconstructed images from the data to analysis using various linear and nonlinear time-series analysis methods to extract dynamic information and isolated dynamic information. These methods are described in detail in the copending Barbour 4147PC2 application.

Some of the methods, systems and experimental results described below focus on optical tomography of human tissue using wavelengths in the near infrared region for the imaging source. However, as disclosed generally herein, it will be appreciated to those skilled in the art that the invention is applicable to the use of essentially any energy source (e.g., electromagnetic, acoustic, and the like) on any scattering medium (e.g., body tissues, oceans, foggy atmospheres, earth strata, industrial materials) so long as diffusive type mechanisms are the principal means for energy transport through the medium.

System

Numerous imaging systems such as those disclosed in the previously mentioned the Barbour '355 patent, the Barbour '322 patent and the Barbour 4147PC1 application have been developed for use in imaging of a scattering medium. A schematic illustration of an exemplary system is shown in FIG. 1. This system includes a computer 102, sources 104, 106, a source demultiplexer 108, an imaging head 110, detectors 112 and a data acquisition board 114.

A target 116 placed in the imaging head 110 is exposed to optical energy from sources 104, 106. The optical energy originating from sources 104, 106, is combined by beam splitter 118 and is delivered to source demultiplexer 108. The source demultiplexer 108 is controlled by computer 102 to direct the optical energy to source fibers 120 sequentially.

Each source fiber 120 carries the optical energy from the demultiplexer 108 to the imaging head 110, where the optical energy is directed into the target 116. The imaging head 110 contains a plurality of source fibers 120 and detector fibers 122 for transmitting and receiving light energy, respectively. Each source fiber 120 forms a source-detector pair with each detector fiber 122 in the imaging head 110 to create a plurality of source-detector pairs. The optical energy entering the target 116 at one location is scattered and may emerge at any location around the target 116. The emerging optical energy is collected by detector fibers 122 mounted in the imaging head 110.

The detector fibers 122 carry the emerging energy to detectors 112, such as photodiodes or a CCD array, that measure the intensity of the optical energy and deliver a corresponding signal to a data acquisition board 114. The data acquisition board 114, in turn, delivers the data to computer 102.

This imaging process is repeated so as to deliver optical energy to each of the source fibers sequentially, a measurement being obtained for detected emerging energy at each detector for each emitting source fiber. This process may continue over a period of time with the computer 102 storing the data for reconstruction of one or more images. Additionally, the system may include two or more imaging heads for comparing one target to another. The computer 102 reconstructs an image representative of the internal optical properties of the target by solving a perturbation equation. It will be appreciated by those skilled in the art that more than one computer can be used to increase data handling and image processing speeds.

The Standard Perturbation Formulation

As discussed above, reconstruction of a cross section image of the absorption and/or scattering properties of the target medium is based on the solution of a perturbation formulation of the radiation transport equation. The perturbation method assumes that the composition of the unknown target medium deviates only by a small amount from a known reference medium. This reduces a highly non-linear problem to one that is linear with respect to the difference in absorption and scattering properties between the target medium under investigation and the reference medium. The resulting standard perturbation equation has the following forms:

$$u - u_r = \delta u = W_r \delta x, \quad (1)$$

In equation (1), $\delta u$ is a vector of source-detector pair intensity differences between the measured target medium and the known reference medium (i.e., $\delta u = u - u_r$). W is the weight matrix describing the influence that each volume element ("voxel") of the reference medium has on energy traveling from each source to each detector, for all source-detector pairs. The volume elements are formed by dividing a slice of the reference medium into an imaginary grid of contiguous, non-overlapping pieces. Physically, the weight matrix contains the first order partial derivatives of the detector responses with respect to the optical coefficients of each volume element of the reference medium. $\delta x$ is the vector of differences between the known optical properties (e.g., absorption and scattering coefficients) of each volume element of the reference medium and the corresponding unknown optical properties of each volume element of the target medium.

This standard perturbation equation assumes (1) use of absolute detector measurements for u, and (2) that the boundary conditions and optical properties of the reference do not vary significantly from the target. Both of these factors are problematic in practice.

The Modified Perturbation Formulation

The present invention modifies the standard perturbation equation by replacing $\delta u$ with a proportionate relative difference between two measured values multiplied by a reference term of the required units as set forth in the equation (2) below:

$$(\delta I_r)_i = \left[ \frac{I_i - (I_0)_i}{(I_0)_i} \right] (I_r)_i \quad (2)$$

where i is the source/detector pair index. In equation (2), $I_r$ is the computed detector reading corresponding to a source-detector pair of a selected reference medium, and I and $I_0$ represent two data measurements for a corresponding source-detector pair on one or more targets (e.g., background vs. target, or time-averaged mean vs. a specific time point, etc.). The resultant term $\delta I_r$ therefore represents a relative difference between two sets of measured data that is then mapped onto a reference medium. Careful examination reveals that this modification has important attributes that limit the effects of modeling errors and minimize ill-conditioning of the inverse problem while retaining the correct units in the solution.

The corresponding perturbation equation using this modified term is:

$$W_r \cdot \delta x = \delta I_r \quad (3)$$

In equation (3) $W_r$ and $\delta x$ are the same as $W_r$ and $\delta u$ in equation (1). Referring to equations (2) and (3), it can be seen that in the limit, when $I_r$ equals to $I_0$, this equation reduces to the standard perturbation formulation shown in equation (1). This formulation represents the Born approximation formulation of the modified perturbation equation. A similar expression may be written for the Rytov approximation in the following form:

$$(\delta I')_i = \ln \frac{I_i}{(I_0)_i};$$

$$(W_r')_{ij} = \frac{(W_r)_{ij}}{(I_r)_i};$$

$$\delta I' = W_r' \delta x \qquad (4)$$

The inventive operation accomplished by equation (2) is to preserve the information content of a measured proportionate relative data vectors obtained from the target medium and to yield data vectors having the correct physical units. Apart from simplifying measurement requirements, the method represented by equations (3) and (4) also reduces susceptibility of the perturbation equation to boundary and optical property variation between the target and the reference medium. Additionally, iterative solutions of equations (3) and (4) can be easily implemented. In principle, the techniques used in the modified perturbation equation, referred to as the normalized difference method (NDM), can be used to evaluate any measured proportionate relative quantity.

Experimental Validation

The following discussion presents results validating the methods and advantages of the present inventions. These examples are presented merely as an illustration of the benefits of applying the NDM approach for the analysis of relative measures from highly scattering media.

Forward Model and Data Acquisition Geometry

For any intended target the perturbation equation is generated for a reference medium having boundary conditions and optical properties substantially similar to the target. The perturbation equation models the energy propagation, e.g. light, in the reference medium as a diffusion process. For a domain $\Omega$ having a boundary $\partial\Omega$, this is represented by the expression:

$$\nabla \cdot [D(r)\nabla u(r)] - \mu_a(r)u(r) = \delta(r - r_s), r \in \Omega \qquad (5)$$

where $u(r)$ is the photon density at position $r$, $r_s$ is the position of a DC point source, and $D(r)$ and $\mu_a(r)$ are the position-dependent diffusion and absorption coefficients, respectively. The diffusion coefficient is defined as:

$$D = 1/[3(\mu_a[r] + \mu_s'[r])] \qquad (6)$$

where $\mu_s'[r]$ is the reduced scattering coefficient. The photon density values at the detectors, i.e., the calculated energy intensity emerging from the reference medium at each detector, were computed by applying Dirichlet boundary conditions on an extrapolated boundary. Depending on the target medium to be explored, sources and detectors for the reference are positioned 1 to 2 transport mean free pathlengths within the boundary of the reference medium.

Solutions to the diffusion equation may be computed by any known means, such as by the KASKADE adaptive finite element method. R. Beck, R. Erdmann and R. Roitzsch, "Kaskade 3.0—An object-oriented adaptive finite element code," Technical report TR 95-4, Konrad-Zuse-Zentrum fur Informationstechnik, Berlin (1995). This is a publicly available code suitable for the solution of partial differential equations in one, two or three dimensions using adaptive finite element techniques. The code can be readily modified to permit solutions to the diffusion equation using a point source. Mesh generation may be by any known method, such as the Delaunay tessellation algorithm originally proposed by Watson. D. F. Watson, "Computing the n-dimensional Delaunay tessellation with applications to Voronoi polytopes", Computer Journal, 24, 167–172 (1981).

The perturbation equation is specific to the boundary conditions and optical properties of the reference medium, including the orientation of the source-detector pairs in relation to one another and the reference medium. These conditions and properties are preferably nearly identical to the target. For example, in the experiments discussed below, the perturbation equation was generated based on an imaging system having six sources and eighteen detectors per source (108 source-detector pairs) with the sources equally spaced at 60 degree intervals around the boundary of the medium and the detectors equally spaced at 20 degree intervals.

Inverse Algorithm

As described above, in the present invention relative intensities are measured for all source-detector pairs using any known imaging system. Image recovery is then achieved using known methods, such as conjugate gradient descent (CGD), or simultaneous algebraic reconstruction techniques (SART), to solve the modified perturbation equation for the absorption and scattering properties of the target. J. Chang, H. L. Graber, R. L. Barbour and R. Aronson, "Recovery of optical cross-section perturbations in dense-scattering media by transport-theory-based imaging operators and steady-state simulate data", Appl. Opt. 35, 3963–3978, (1996) (the disclosure of which is incorporated herein by reference). For example, the experimental results discussed below were achieved using a CGD solver with and without matrix resealing. In addition, a weight matrix rescaling (WMR) technique may be used to improve the ill-conditioning of the weight matrix. The effect of resealing the weight matrix is to make it more uniform. Two rescaling criteria can be applied for this purpose: (1) rescaling the maximum of each column to 1; or (2) rescaling the average of each column to 1. In the experimental results below, when WMR was used, criterion 1 was applied for image recovery. The solution to the modified perturbation equation provides a relative measure of the difference between the cross-sectional optical properties of a target during the first and second measurements I and $I_0$. The values from this solution are used to generate cross-sectional images representative of the target's internal optical properties.

Test Cases Explored

The following discussion presents results obtained for seven test cases comparing image reconstruction using the known standard perturbation formulation with the modified perturbation formulation of the present invention. These examples are presented merely as an illustration of the benefits of the modified perturbation method of the present invention.

The reconstruction results presented in the test case are limited to solution of the first order Born approximation. The coefficient values for absorption and diffusion coefficients were computed simultaneously. For each case tested, measures of error, contrast accuracy and resolution were also computed. These are defined as follows:

i. Image error is the relative root mean square error (RMSE)

$$RMSE = \sqrt{\frac{\sum_{j=1}^{M}(x_j - a_j)^2}{\sum_{j=1}^{M}(a_j)^2}} \quad (7)$$

where $a_j$ and $x_j$ are the actual and reconstructed values of the optical coefficient, and M is the number of volume elements used for reconstruction.

ii. Image contrast accuracy was determined by computing the mean value of the recovered perturbation coefficient along the transect bisecting the two objects.

iii. Resolution was measured by computing the mean value of the full-width half-maximum of the two reconstructed objects along the transect bisecting the inclusions.

Figure 2A:
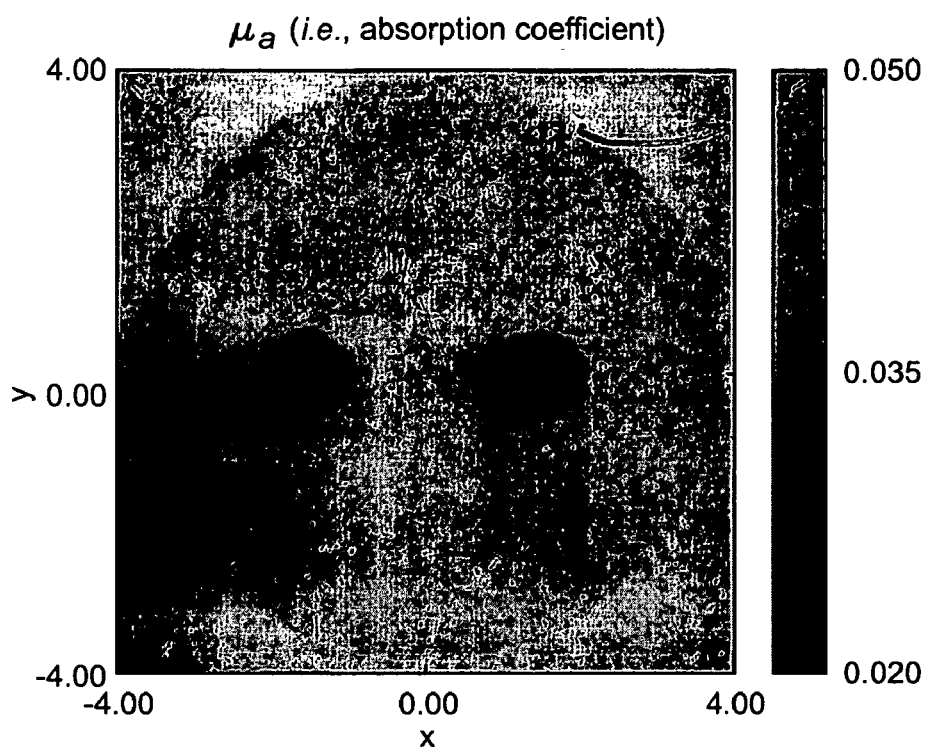
FIG. 2A is a cross-sectional image of the absorption coefficients of the target.
Figure 2B:
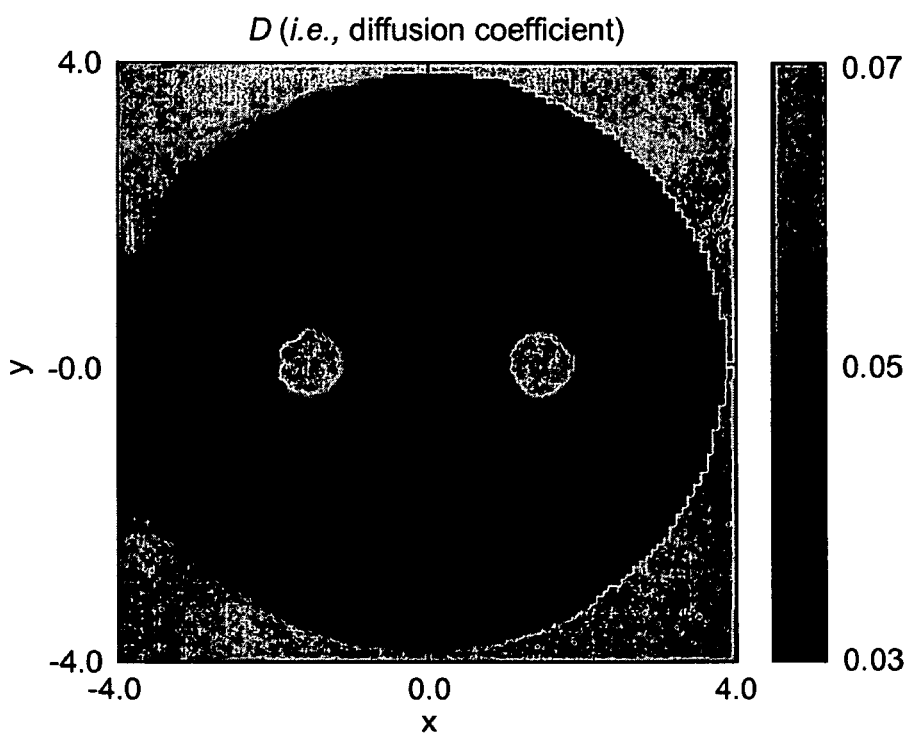
FIG. 2B is a cross-sectional image of the diffusion coefficients of the target.

FIGS. 2A and 2B show the cross-sectional geometry and absorption (FIG. 2A) and diffusion (FIG. 2B) coefficient profiles of the target medium explored. The target medium is 8 cm in diameter and has two included objects each 1 cm in diameter and separated by 3 cm symmetrically about the center of a homogeneous background medium. Optical properties of the background and included objects are 0.04 and 0.02 cm$^{-1}$ for $\mu_a$ (absorption coefficient), and 10 and 5 cm$^{-1}$ for $\mu_s$ (scattering coefficient), respectively.

The table of FIG. 3 lists the various test cases explored. The symbol "V" indicates that the parameter was varied, "C" indicates that the parameter was held constant, and "/" indicates that the parameter was not considered. The test cases allowed at least partial isolation of the effect of variations in each of the input parameters on the resultant image for different reconstruction schemes and perturbation formulations. This testing permitted exploration of the dependence of ill-conditioning on the different input parameters that influence the accuracy and stability of the image reconstruction.

Test cases 1 and 2 examined the general case where the reference medium is based only on an estimate of the background optical properties of the target medium. The estimated properties were varied over a broad range, ranging from 0.0 cm$^{-1}$ to 0.3 cm$^{-1}$ in $\mu_a$ and from 3 cm$^{-1}$ to 30 cm$^{-1}$ in $\mu_s$. For purposes of comparison, test cases 3 through 7 explored the dependence of image quality on the varied parameters using the standard perturbation formulation.

Test cases 3 and 4 mainly mirror conditions explored in cases 1 and 2 with the exceptions that the standard perturbation formulation was evaluated, and a narrower range of coefficient values was considered for the reference medium. Here the general case is also considered where only an estimate of the background optical properties of the target medium is available. The range of values for the optical properties explored were from 0.02 cm$^{-1}$ to 0.08 cm$^{-1}$ in $\mu_a$, and from 5 cm$^{-1}$ to 15 cm$^{-1}$ in $\mu_s$.

Cases 5 and 6 consider the special situation where prior knowledge of the background properties of the target medium is known. The parameters varied were $W_r$ and $I_r$, referred to as $W_b$ and $I_b$, respectively. The range of optical properties varied for test 5 is same as in case 1. For case 6, the range of optical properties varied is the same as in case 3. Test case 7 explores the effect of a constant calibration error in measurement, and assumes prior knowledge of the background properties of the target medium.

Results

Data shown in FIGS. 4 through 9 illustrates the influence that the varied parameters listed in FIG. 3 have on the reconstruction results derived from a first-order Born approximation using the standard and modified perturbation formulations. The results presented are listed in a matrix format. The value of the absorption and scattering coefficient for the reference medium is fixed for each row and column, respectively. Varied is the value of these parameters along the orthogonal direction. Shown in the figures are the reconstruction profiles for all test cases explored except case 4, whose findings are reported in the text.

Qualitative Analysis

Figure 4A:
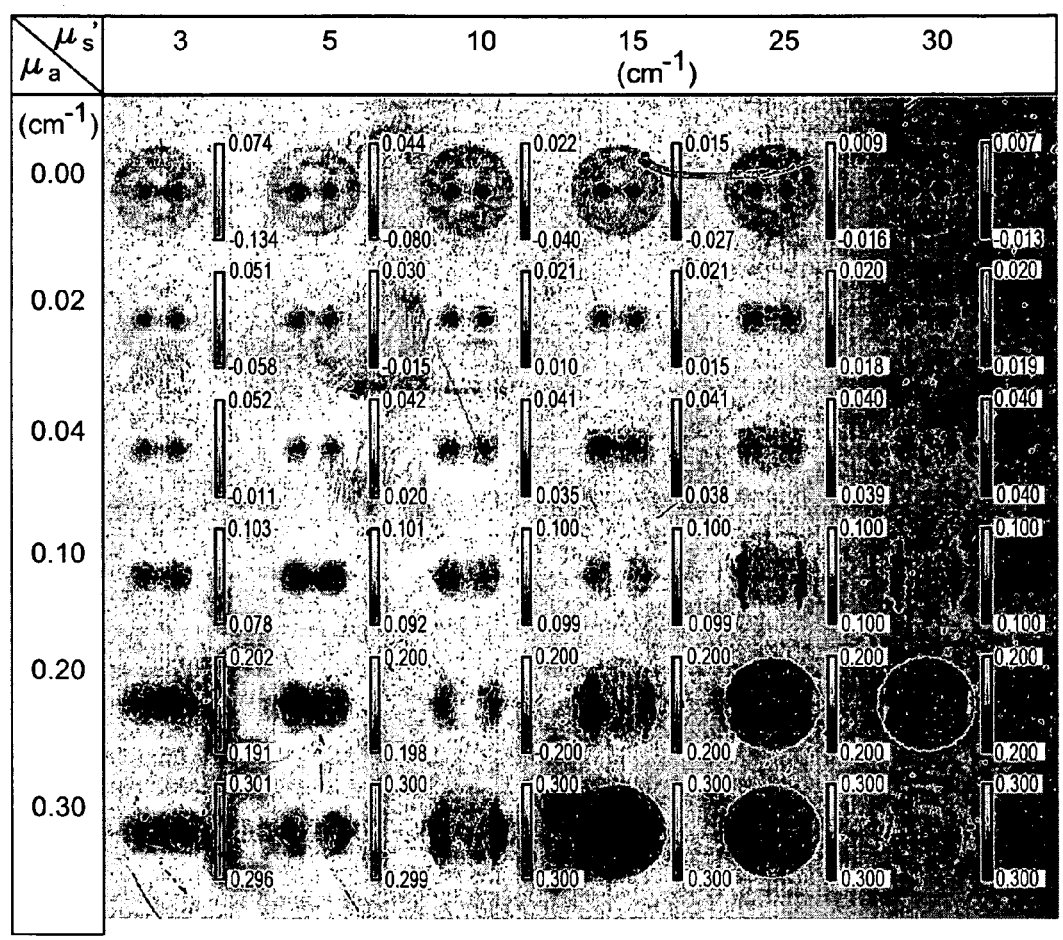
FIG. 4A is a series of reconstructed cross-sectional absorption profile images of the target obtained in test case 1 of FIG. 3.
Figure 4B:
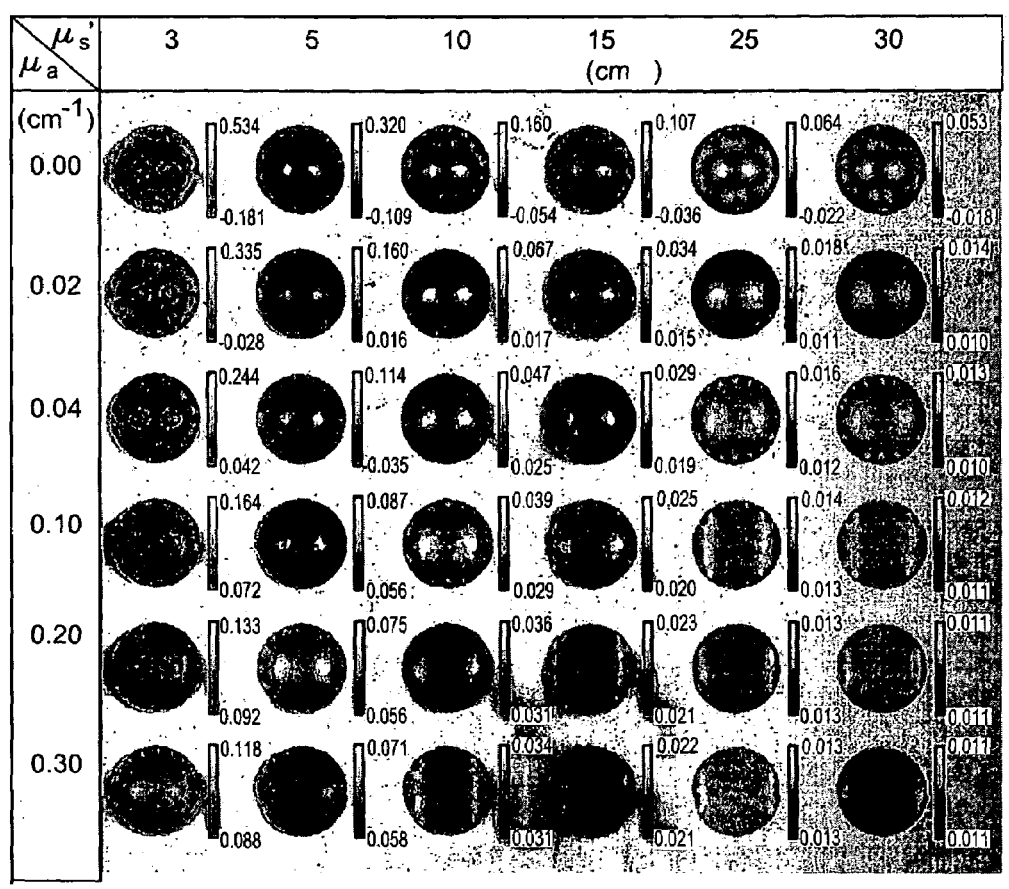
FIG. 4B is a series of reconstructed cross-sectional diffusion profile images of the target obtained in test case 1 of FIG. 3.
Figure 5A:
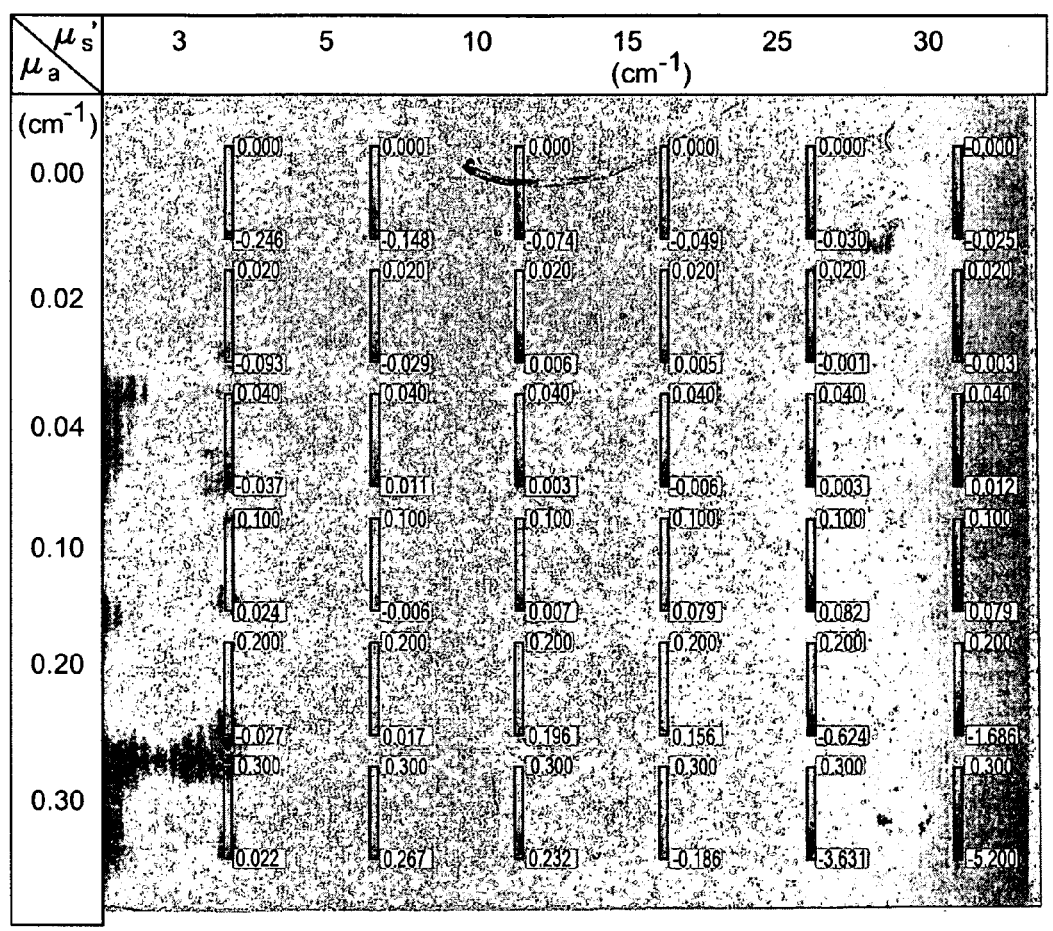
FIG. 5A is a series of reconstructed cross-sectional absorption profile images of the target obtained in test case 2 of FIG. 3.
Figure 5B:
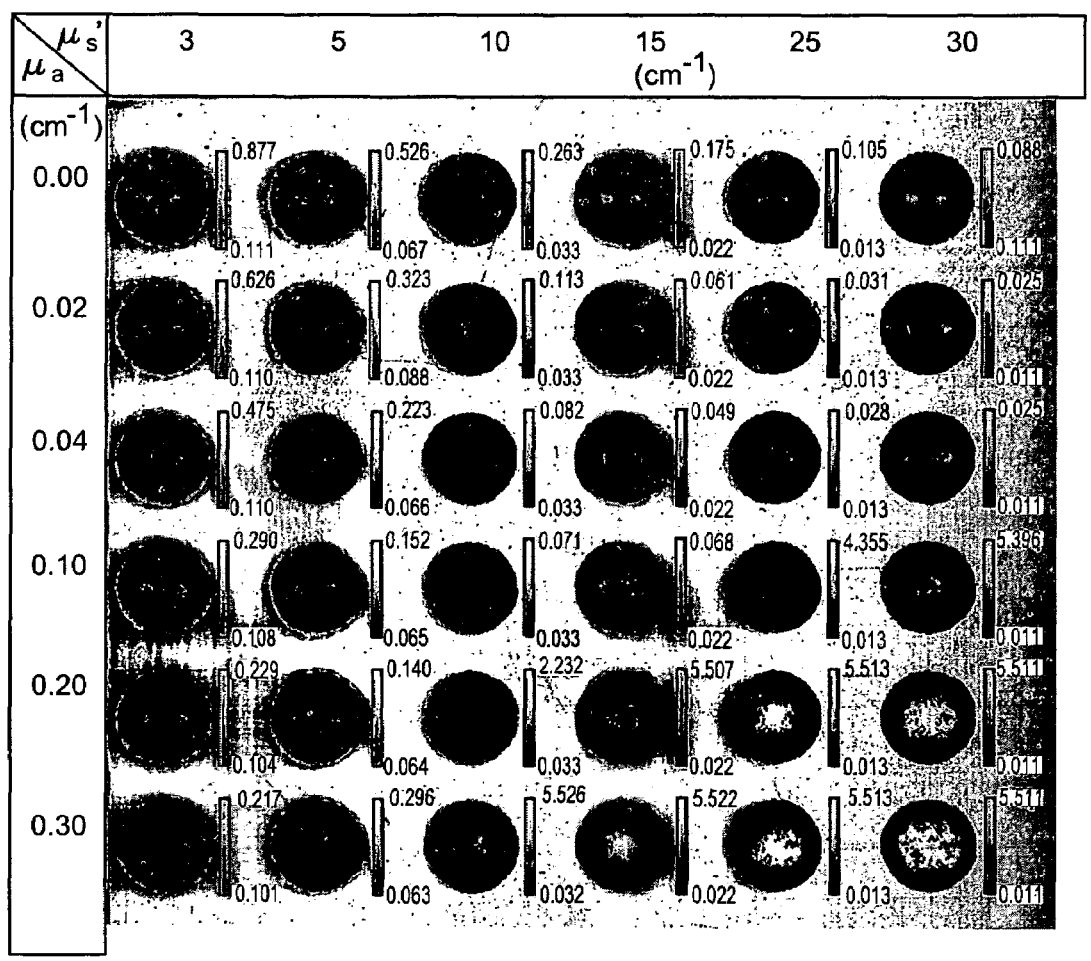
FIG. 5B is a series of reconstructed cross-sectional diffusion profile images of the target obtained in test case 2 of FIG. 3.

Data in FIGS. 4 and 5 show the quality of reconstructed images obtained using equation (3). FIGS. 4A and 5A illustrate the computed absorption maps, while FIGS. 4B and 5B show the computed diffusion maps. Compared to the original profiles shown in FIG. 2, these findings illustrate that qualitatively accurate results, revealing the two-object structure, are obtained over a broad range of values for the selected reference medium. Artifact dominated results are limited to cases in the lower right corner of the matrix. These correspond to those reference media having absorption and scattering coefficient values significantly greater than the background of the target medium. Quantitative analysis of these results is presented in the next section. Comparison of images shown in FIGS. 4 and 5 reveals that the matrix rescaling method is capable of providing a higher resolution image, though over a reduced range of values for the reference medium. For example, comparison of results reveals that the matrix resealing method yields only artifacts in the absorption map for non-absorbing reference media, while under the same conditions the diffusion coefficient maps reveal two completely resolved objects. In the absence of matrix rescaling, both coefficient maps reveal the presence of the included objects, though with reduced edge resolution and more artifacts in the diffusion map. The added improvement using matrix rescaling, however, is achieved under the limiting conditions of a range constraint (positive for D and negative for $\mu_a$). Overall, the range of values for the reference medium's optical properties for which qualitatively accurate maps are obtained for both inverse methods is much greater than previously reported. S. R. Arridge, M. Schweiger, "Sensitivity to prior knowledge in optical tomographic reconstruction", in Proc. Optical tomography, photon migration and spectroscopy of tissue and model media: Theory, human studies, and instrumentation, SPIE, 2389, 378–388, (1995) (the disclosure of which is incorporated herein by reference).

Figure 6A:
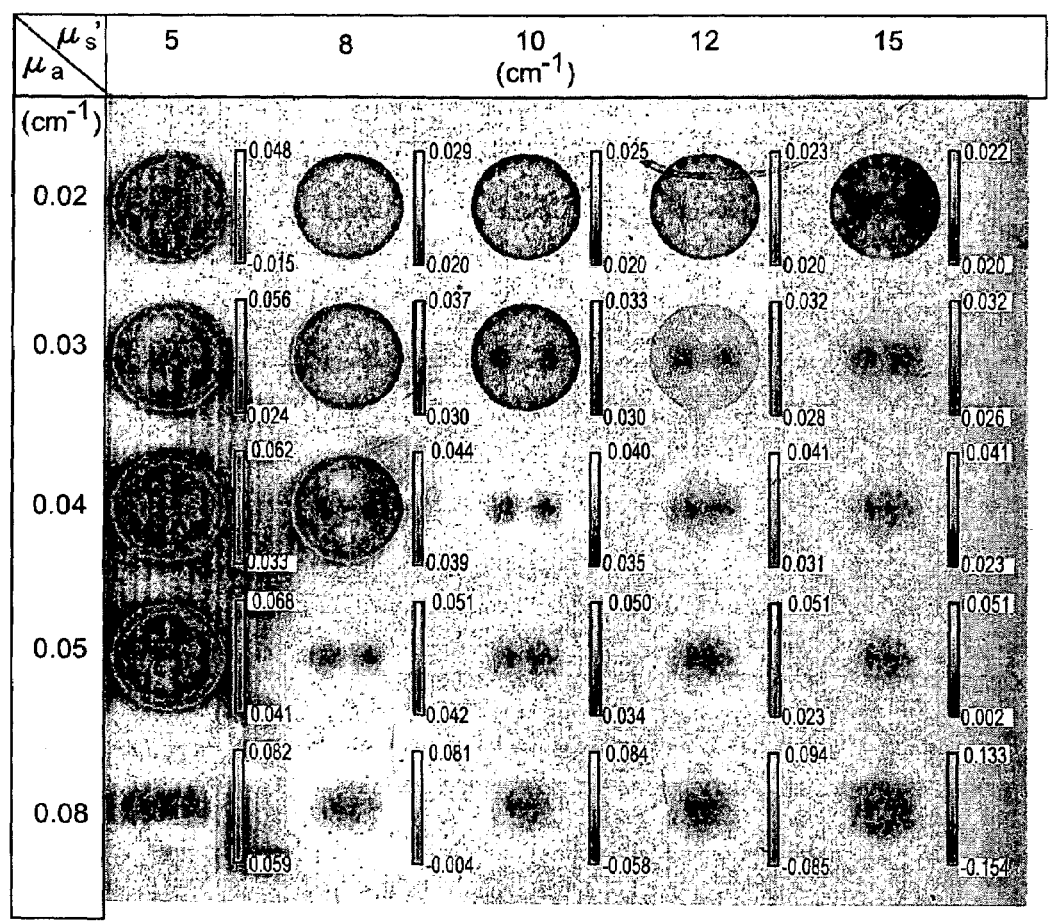
FIG. 6A is a series of reconstructed cross-sectional absorption profile images of the target obtained in test case 3 of FIG. 3.
Figure 6B:
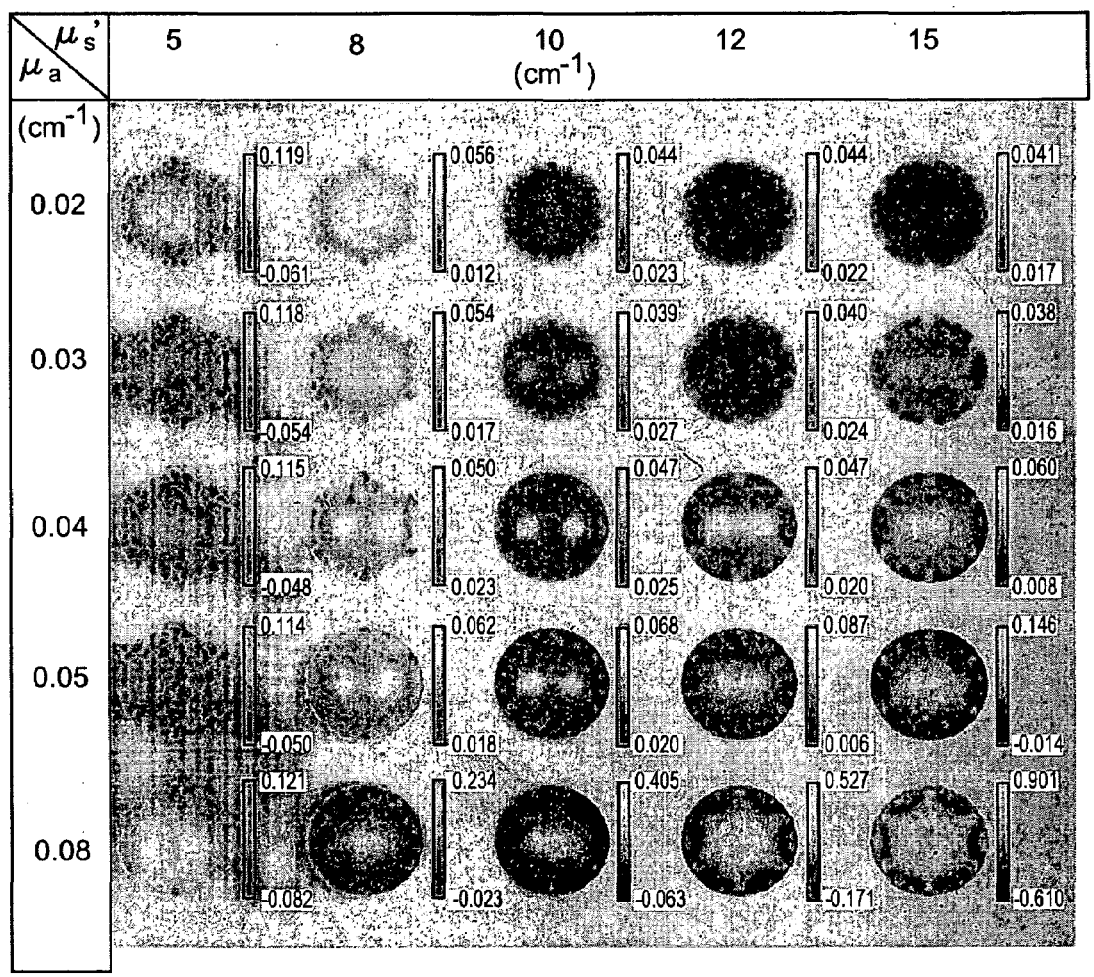
FIG. 6B is a series of reconstructed cross-sectional diffusion profile images of the target obtained in test case 3 of FIG. 3.

Shown in FIG. 6 are results from case 3 evaluated using equation (1). Compared to results shown in FIGS. 4 and 5, a more limited range of values of optical properties for the reference medium were examined, since outside of this range, only artifact was recovered. Even within the explored range, significant instability was observed for relatively small variations in the reference medium. This sensitivity indicates a state of ill-conditioning that is alleviated using the modified perturbation formulation (equation 3). Not shown are results from case 4 using the matrix rescaling method. In case 4, even greater instability was observed than in the case using CGD only.

The parameters varied in the above figures include both the computed reference intensity and the weight matrix. This is the general case where both quantities can only be estimated and are computed from a specified reference medium.

Figure 7A:
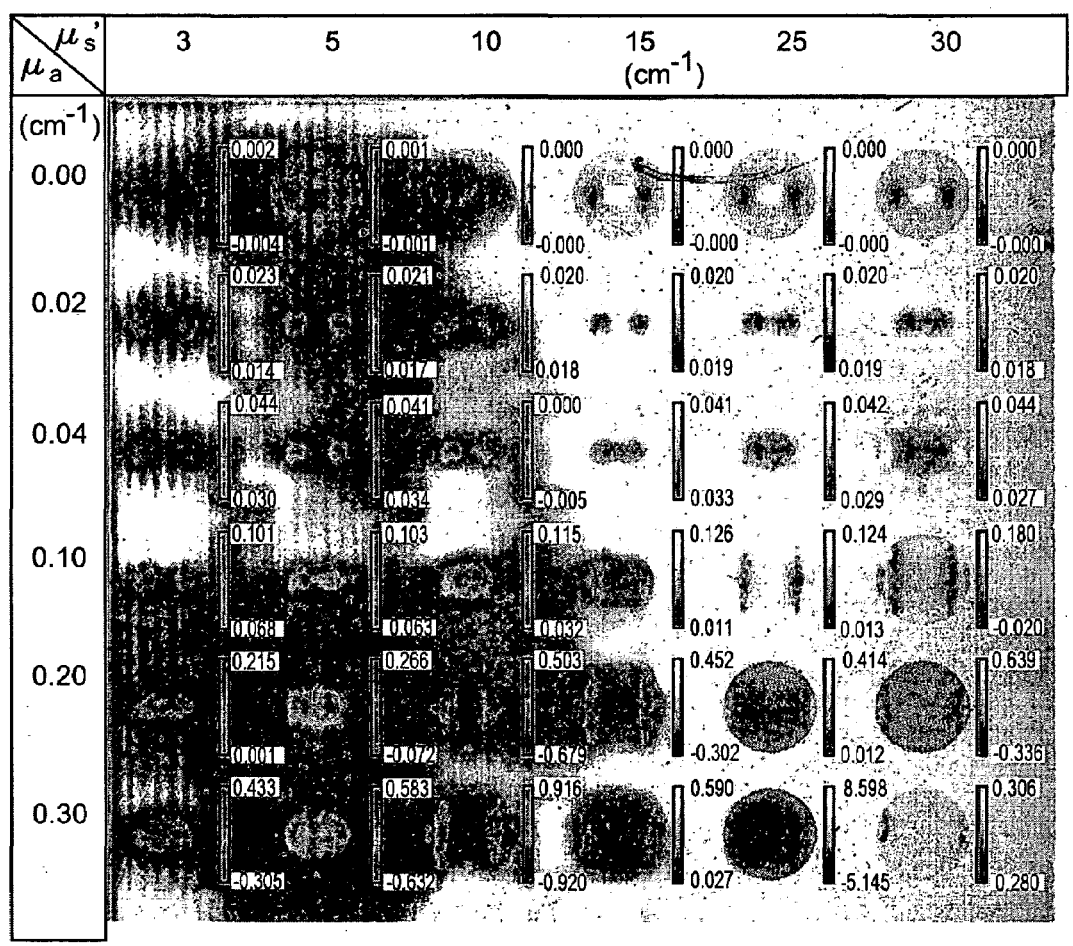
FIG. 7A is a series of reconstructed cross-sectional absorption profile images of the target obtained in test case 5 of FIG. 3.
Figure 7B:
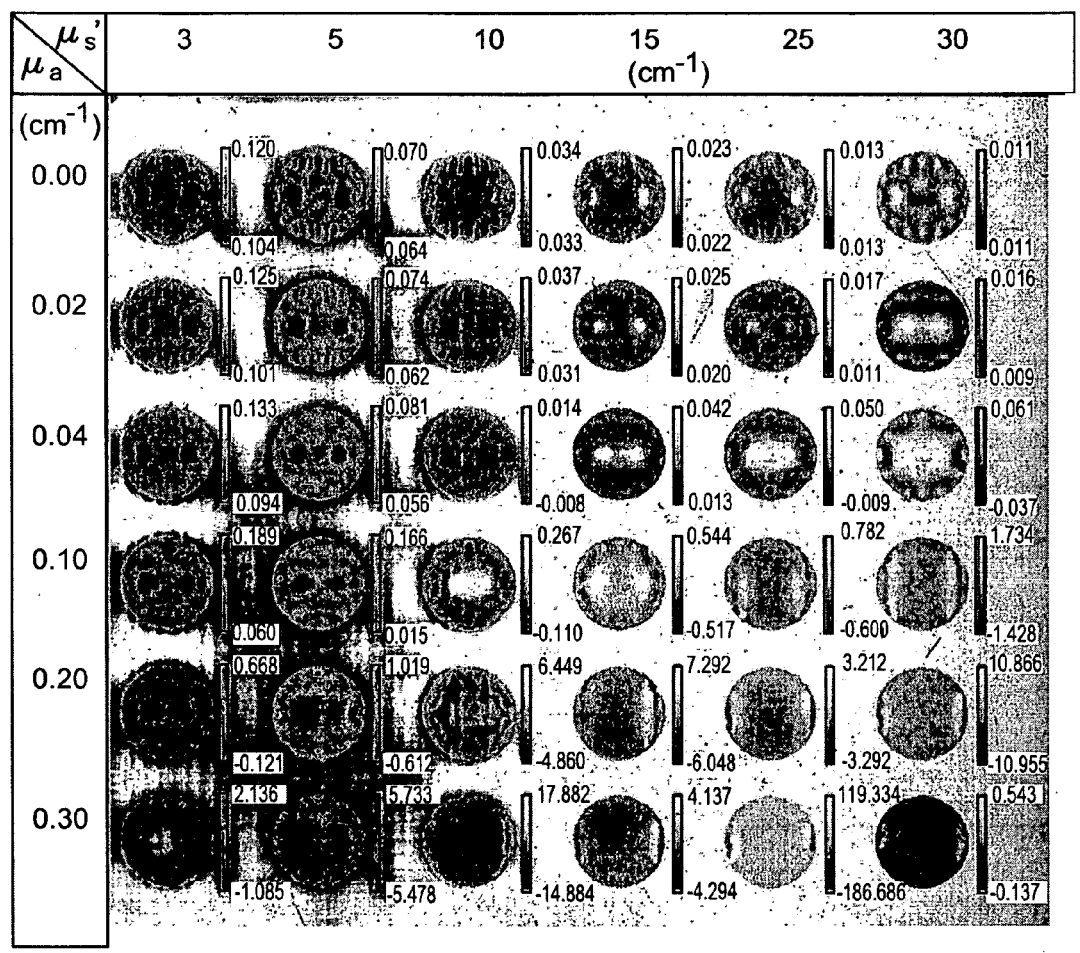
FIG. 7B is a series of reconstructed cross-sectional diffusion profile images of the target obtained in test case 5 of FIG. 3.
Figure 8A:
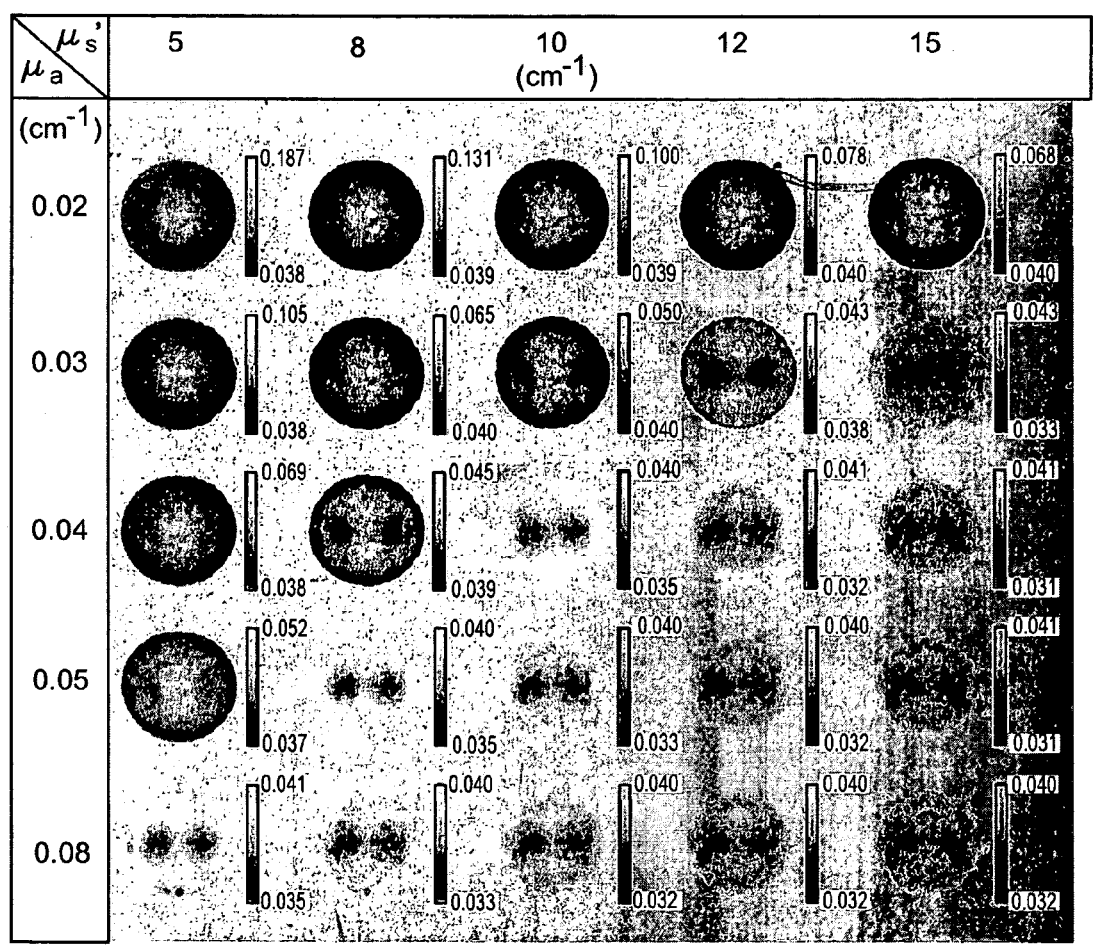
FIG. 8A is a series of reconstructed cross-sectional absorption profile images of the target obtained in test case 6 of FIG. 3.
Figure 8B:
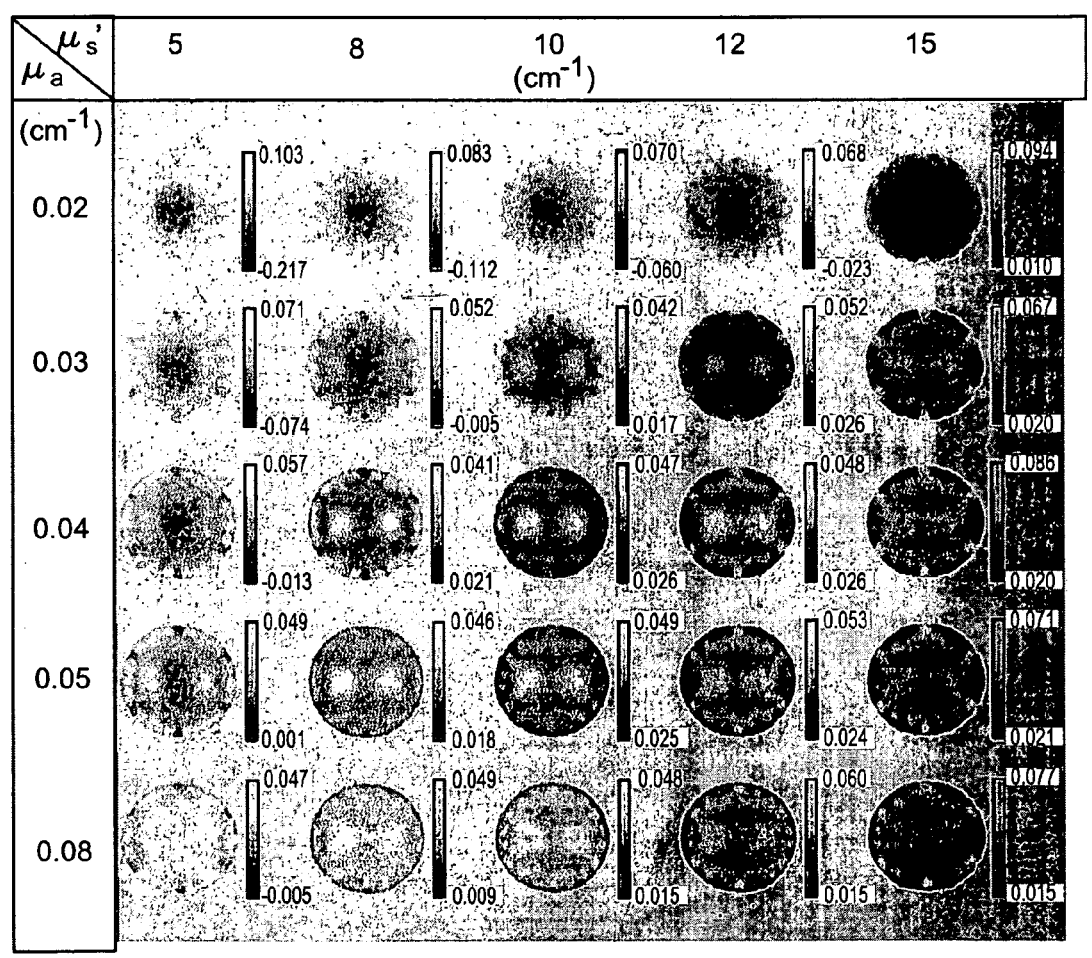
FIG. 8B is a series of reconstructed cross-sectional diffusion profile images of the target obtained in test case 6 of FIG. 3.
Figure 9A:
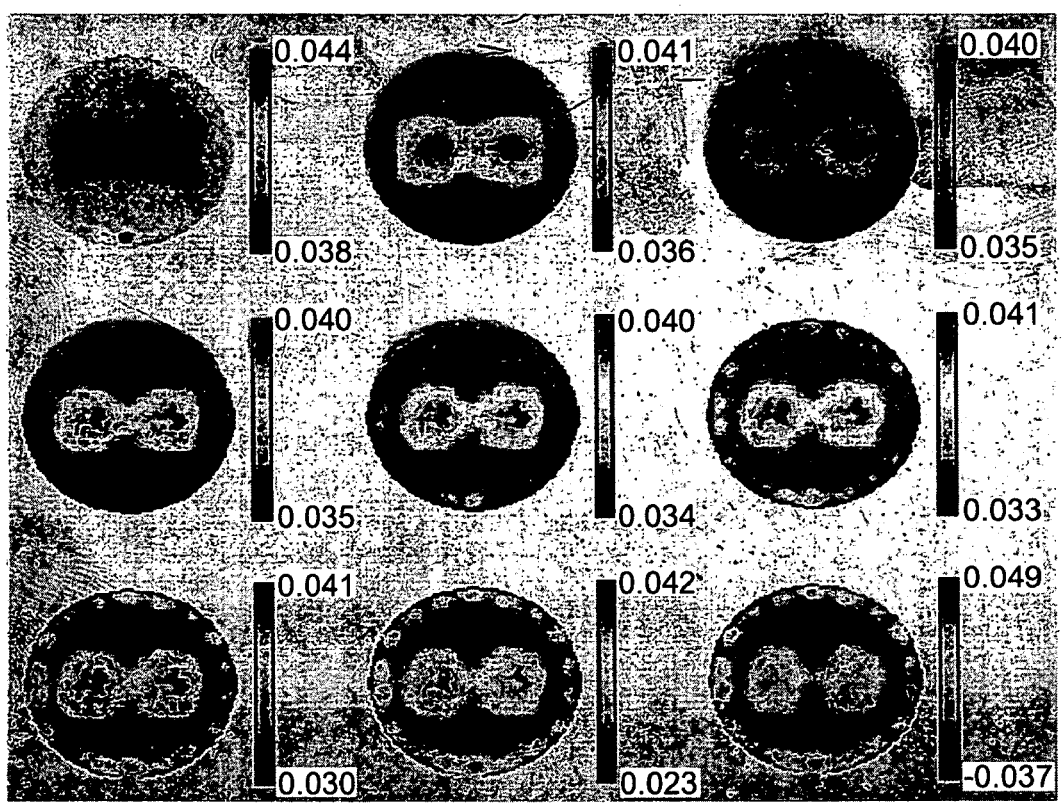
FIG. 9A is a series of reconstructed cross-sectional absorption profile images of the target obtained in test case 7 of FIG. 3.
Figure 9B:
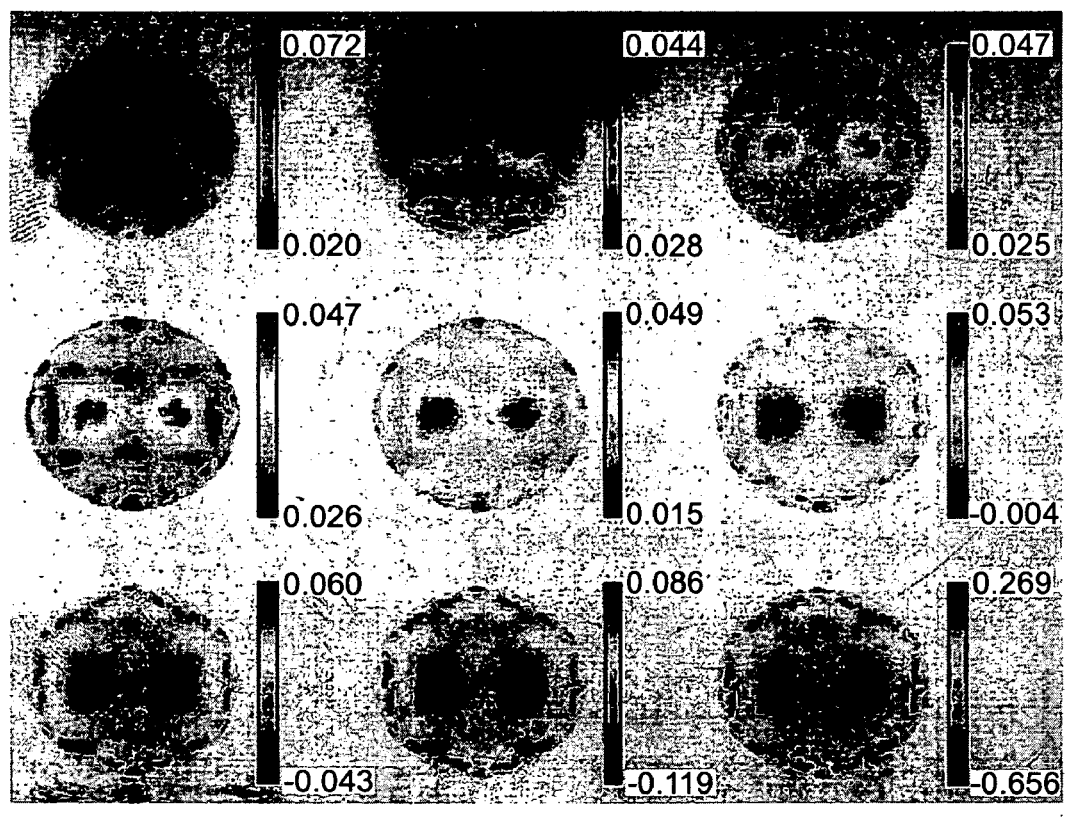
FIG. 9B is a series of reconstructed cross-sectional diffusion profile images of the target obtained in test case 7 of FIG. 3.

Results shown in FIGS. 7 through 9 explore the special cases where errors occur only in one parameter. Data in FIG. 7 illustrates the influence of errors in the estimated weight matrix. Assumed is prior knowledge of the reference detector intensity values for the background medium. In practice this would correspond to situations where a measurement was made in the presence and absence of an included object. Inspection reveals that qualitatively accurate results are obtained over a significantly broader range of reference values than those presented in FIG. 7. This finding suggests that the principal origin of the ill-conditioning of the inverse problem is associated with errors in the estimated reference intensity.

Results shown in FIG. 8 explore this possibility directly. In this situation, we assume the unlikely case where accurate prior knowledge of the weight matrix for the target medium is available. Comparison of the results in FIG. 8 to the results in FIG. 6 illustrates some improvement in the range of reference media yielding qualitatively accurate results. However, this range is small compared to the situations tested in FIG. 8 for the standard perturbation formulation and for the modified perturbation formulation in FIGS. 4 and 5.

Finally, in FIG. 9, we test the case where accurate prior knowledge for the weight matrix and reference detector values are available and a constant error of measurement is introduced. The error added to the measured detector reading, I, varies from −50 to 900%. Variations in constant calibration error corresponding to FIG. 8 are shown in FIG. 9. Under these conditions, the results show that a constant calibration error does not significantly affect the qualitative accuracy of the computed images. It is worth noting that errors of this type will not exist using the modified perturbation formulation.

Quantitative Analysis

A quantitative analysis of the image data was made by computing measures of error, resolution and contrast. Results shown in FIGS. 11 and 12 are the corresponding values computed from data shown in FIGS. 4 and 5. The format of the data is the same as in FIG. 4 (i.e., data in the rows are derived for a fixed value of absorption, while column data is derived for a fixed value of scattering).

Inspection of FIGS. 11 and 12 reveals, not surprisingly, that the lowest image RMSE is achieved when the selected reference medium matches the background optical properties of the target medium. Consistent with this finding is that nearly equivalent error values were obtained for those maps in which one of the fixed coefficient values for the reference medium matched that of the background. Interestingly, in the absence of WMR, whereas these conditions produced the lowest total error values for the image map, improved accuracy of object contrast was obtained using reference media generally having reduced scattering and increased absorption values compared to those of the background. An exception to this was the case where the background absorption level in the reference medium was reduced while scattering value matched the object. With WMR, the best accuracy for object coefficient values was achieved when the reference medium matched the coefficient values of the background medium. This is not unexpected given the imposed constraint. Overall there is evidence of a trade-off between artifact levels and accuracy in object contrast. Potentially significant is the observation of several instances where considerably enhanced object contrast is seen without undue degradation of image quality. This is observed with either inverse algorithm, though the trends are somewhat different. In the absence of WMR, enhanced contrast for both absorption and diffusion maps are seen using reference media whose absorption and scattering coefficient values are lower than the background. Enhanced contrast is also seen in the case of a non-absorbing reference medium, although increased artifacts are present. With WMR, improved object contrast is also seen with reference media having reduced scattering, but the trend in contrast enhancement is opposite for the different coefficients and depends strongly on the value of the absorption coefficient. Increasing the absorption coefficient value for the reference medium increases the object contrast value for absorption while reducing the contrast for the diffusion coefficient. Inspection of results reported for edge resolution reveal an under and over estimate of object diameter for images computed with and without the WMR, respectively. Whereas it is often best to avoid errors in edge resolution, the resolution of the images obtained using the WMR method is striking.

Experimental Validation of Modified Perturbation (NDM) Formulation

Figure 13A:
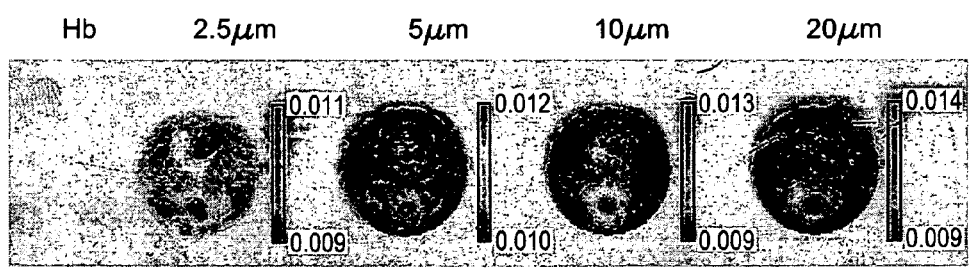
FIG. 13A is a series of reconstructed cross-sectional absorption profile images of the target shown in FIG. 15 with varying concentrations of hemoglobin.
Figure 13B:
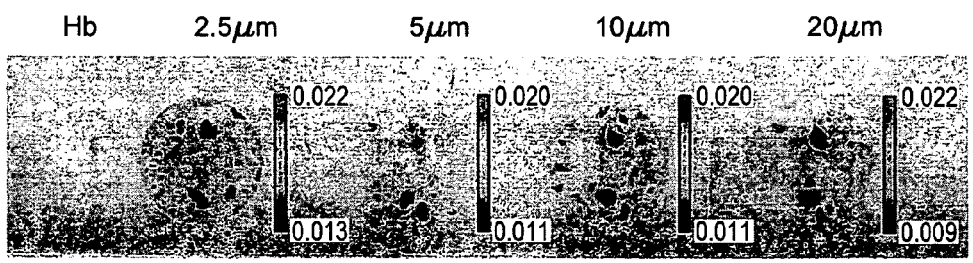
FIG. 13B is a series of reconstructed cross-sectional diffusion profile images of the target shown in FIG. 15 with varying concentrations of hemoglobin.
Figure 14A:
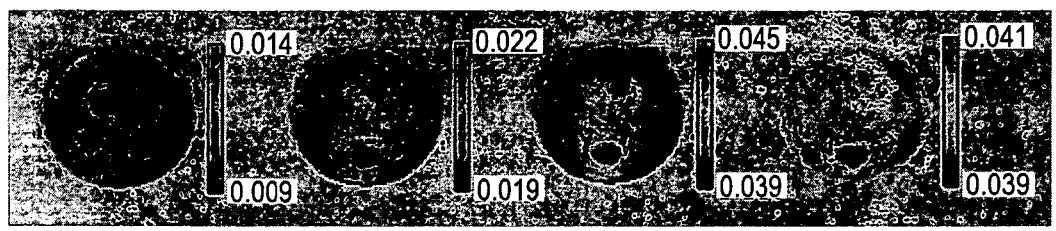
FIG. 14A is a series of reconstructed cross-sectional absorption profile images of the target shown in FIG. 15 with varying reference medium properties.
Figure 14B:
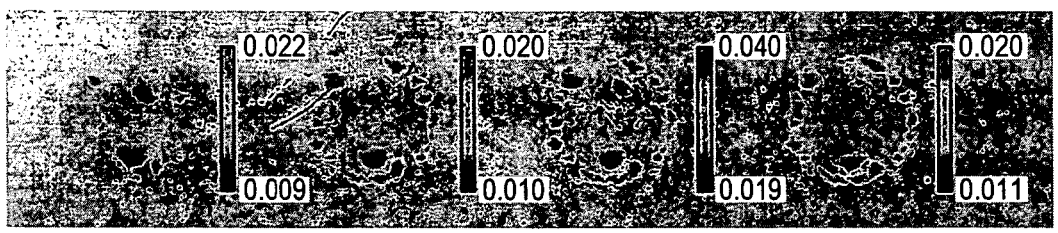
FIG. 14B is a series of reconstructed cross-sectional diffusion profile images of the target shown in FIG. 15 with varying reference medium properties.
Figure 15:
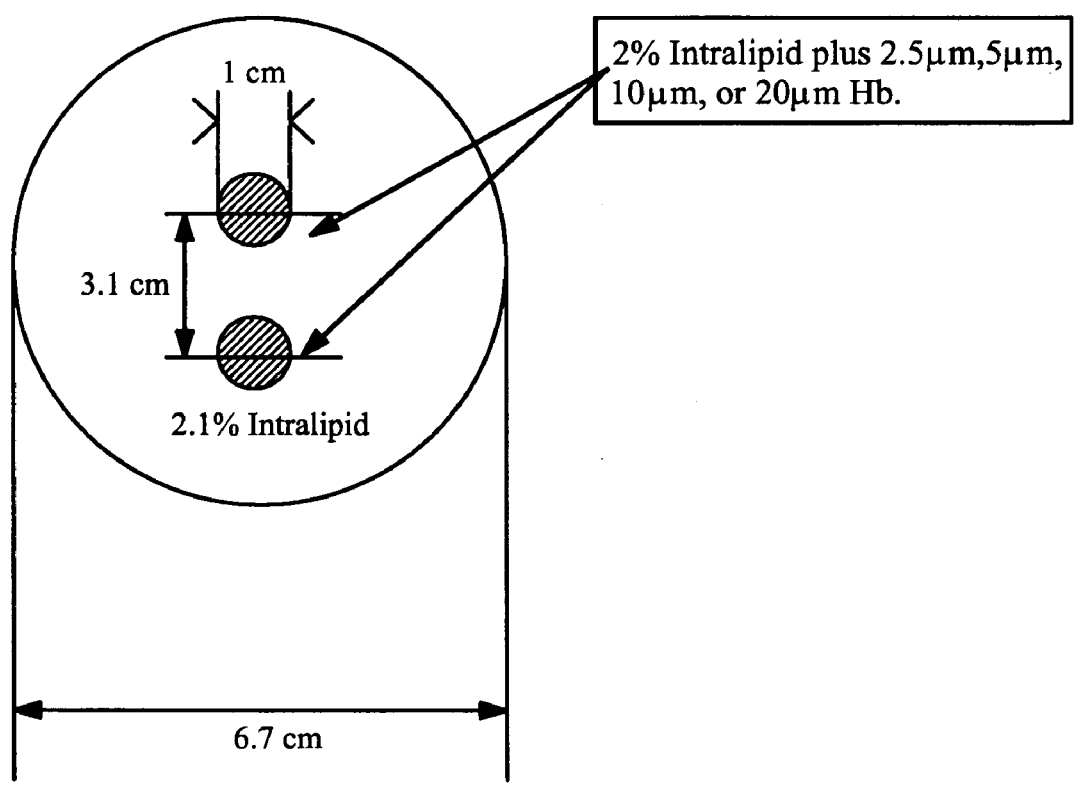
FIG. 15 is a schematic illustration of a phantom study.

Experimental verification demonstrating that the modified perturbation formulation is capable of resolving internal structure of a dense scattering medium is given in FIGS. 13 and 14. Tomographic measurements were performed at 780 nm using the IRIS imaging system previously described. R. L. Barbour, R. Andronica, Q. Sha, H. L. Graber, and I. Soller, "Development and evaluation of the IRIS-OPTIsoaner, a general-purpose optical tomographic imaging system." In *Advance in Optical Imaging and Photon Migration*, J. G. Fujimoto et al, ed., Vol. 21 of OSA Proceeding Series, pp. 251– 255, (1998) (the disclosures of which are incorporated herein by reference). The target medium was a latex laboratory glove filled with 2% (v/v) Intralipid suspended from a holder in a pendant position. Added to the glove were two 1 cm diameter plastic tubes filled with varying concentrations of hemoglobin (Hb) in the amount of 5 μm, 10 μm, 20 μm, and 40 μm. A cross section of the phantom set-up is shown in FIG. 15. The pass-through diameter of the IRIS imaging head was closed until gentle contact with the glove was achieved. The diameter of the glove in the measurement plane was 6.7 cm. Above and below this plane, the glove assumed an arbitrary geometry. Tomographic measurements were performed using the same measurement geometry described for the numerical studies. Optical measurements were performed in the presence and absence of the included objects from which the relative intensity values were derived. The resultant data vectors were then evaluated by equation (3) using a regularized CGD method without weight matrix rescaling. The coefficient values for the reference medium used were varied from 0.01 to 0.04 cm$^{-1}$ in $\mu_a$ and 10 to 20 cm$^{-1}$ in $\mu_s$.

Reconstructed $\mu_a$ and D maps for each experiment with different concentrations of hemoglobin in the two tubes using a specific reference medium are shown in FIG. 13. Inspection reveals two well-resolved objects whose contrast in both coefficients increases with increasing concentration of added absorber. Quantitatively, the dependence of image contrast on absorber concentration is less than expected ($\delta\mu_a$ recovered=0.005 vs. $\delta\mu_a$ actual=0.015 cm$^{-1}$) indicating perhaps either a self-shielding effect, limits of a first order Born solution or both. Results shown in FIG. 14 demonstrate that images of similar quality are derivable over a range of reference media, a result consistent with the above described numerical studies.

DISCUSSION AND CONCLUSIONS

The present invention describes and evaluates a new formulation for the inverse problem for imaging in highly scattering media. Motivating this development has been an appreciation of the expected limits imposed by practical measurements, especially as it relates to the dependence of image accuracy on instrument calibration and the ability to specify an accurate reference medium. This concern arises because many of the anticipated clinical applications will require some level of accuracy in the computed coefficient values. An accurate solution will require an explicit accounting of various factors intrinsic to the detector (e.g., quantum efficiency, acceptance angle etc.), as well as features specific to the target. This includes, in particular, the efficiency of contact with the target medium by the detector or intervening optical fibers that deliver and collect the optical signal. This is necessary because all model-based imaging schemes proposed for imaging in highly scattering media assume equivalency in detector efficiency for measured and computed values. Failure to account for such variables will introduce error whose magnitude and stability could vary considerably depending on the specifics of the measuring device and target medium.

In principle, these uncertainties can be taken into account, although not without considerable effort for instrument design and added complexity of the forward modeling code. Generally speaking, such limitations are widely appreciated by many, both in this and other imaging communities. The goal in identifying practical schemes is to devise strategies that are mainly insensitive to such uncertainties. Often a desirable starting point is to employ schemes that provide useful information based on some type of relative measurement. Previously, we described a back projection scheme that evaluated relative detector data. R. L. Barbour, H. Graber, R. Aronson, and J. Lubowski, "Model for 3-D optical imaging of tissue," Int. Geosci and Remote Sensing Symp., (IGARSS), 2, 1395–1399 (1990) (the disclosures of which are incorporated herein by reference). H. L. Graber, J. Chang, J. Lubowsky, R. Aronson and R. L. Barbour, "Near infrared absorption imaging in dense scattering media by steady-state diffusion tomography", in Proc. *Photon migration and imaging in random media and tissues"*, 1888, 372–386, (1993) (the disclosures of which are incorporated herein by reference). This formulation employed model-based imaging operators, but produced solutions lacking physical units. The lack of physical units (1) makes specific interpretation difficult, especially should multi-wavelength measurements be considered, and (2) makes efforts to compute iterative updates difficult. However, this scheme however showed that in all cases tested, high contrast images having excellent edge detection and object location were achievable. R. L. Barbour, H. Graber, R. Aronson, and J. Lubowski, "Model for 3-D optical imaging of tissue," Int. Geosci and Remote Sensing Symp., (IGARSS), 2, 1395–1399 (1990) (the disclosures of which are incorporated herein by reference). H. L. Graber, J. Chang, J. Lubowsky, R. Aronson and R. L. Barbour, "Near infrared absorption imaging in dense scattering media by steady-state diffusion tomography", in Proc. *Photon migration and imaging in random media and tissues "*, 1888, 372–386, (1993) (the disclosures of which are incorporated herein by reference). H. L. Graber, J. Chang and R. L. Barbour "Imaging of multiple targets in dense scattering media", in Proc. *Experimental and numerical methods for solving ill-posed inverse problems: Medical and non-medical applications*, SPIE, 2570, 219–234, (1995) (the disclosures of which are incorporated herein by reference).

In subsequent studies we have identified that the expression evaluated using this method has a functional form of:

$$\left(\frac{\delta I}{I_0}\right)_i \left(\sum_{j=1}^{N} (W_r)_{ij}\right) = \sum_{j=1}^{N} ((W_r)_{ij} (\delta x)_j) \quad (8)$$

for each source-detector pair where, i is the source-detector pair number, j is the element number and N is the number of elements. It is apparent that this expression is similar to the following equation, which is equation (3) with a different form, $$\left(\frac{\delta I}{I_0}\right)_i (I_r)_i = \sum_{j=1}^{N} ((W_r)_{ij} (\delta x)_j) \quad (9)$$

While it is evident the two expressions are not equivalent, a more careful examination reveals that the different quantities on the left hand side of Eqs. (8) and (9) (i.e., the sum of weights and the reference intensity for the $i^{th}$ source-detector pair) are closely related. The influence that different forms of the data vector have on image recovery is discussed subsequently.

Solution of the perturbation formulation requires specification of three input data sets. Two quantities, $I_r$ and $W_r$, are typically computed from a specified reference medium, and the third quantity is the measured response, I. Results presented in FIGS. 6 through 9 have explored the influence that errors in each of these quantities have on the quality of computed reconstructions for the original perturbation formulation (equation (1)). Most sensitive was the case where both quantities $I_r$ and $W_r$ are in error (c.f., test case 3 and FIG. 6). This suggests that the origin of excessive ill-conditioning can be traced to one or both of the quantities $I_r$ and $W_r$. When prior knowledge $W_r$ is assumed, errors in $I_r$ (test case 6) still produced highly unstable solutions (FIG. 8). On the other hand, when prior knowledge of the correct values of $I_r$ is assumed (test case 5), the sensitivity to errors in $W_r$ is much less (FIG. 7), at least qualitatively. This strongly suggests that the principal cause of instability can be traced to errors in $I_r$. It also indicates that should error free measurement data be available, significant instability in the solution domain would persist. The influence of systematic error in measurement was explored in test case 7. Results in FIG. 9 showed that under conditions where prior knowledge of $I_r$ and $W_r$ for the background is available, qualitatively accurate solutions could be obtained even in the presence of 900% error. In the absence of this prior knowledge, additional error due to this quantity further degraded image quality even in those cases where the selected reference medium differed only minimally from the background.

Figure 16B:
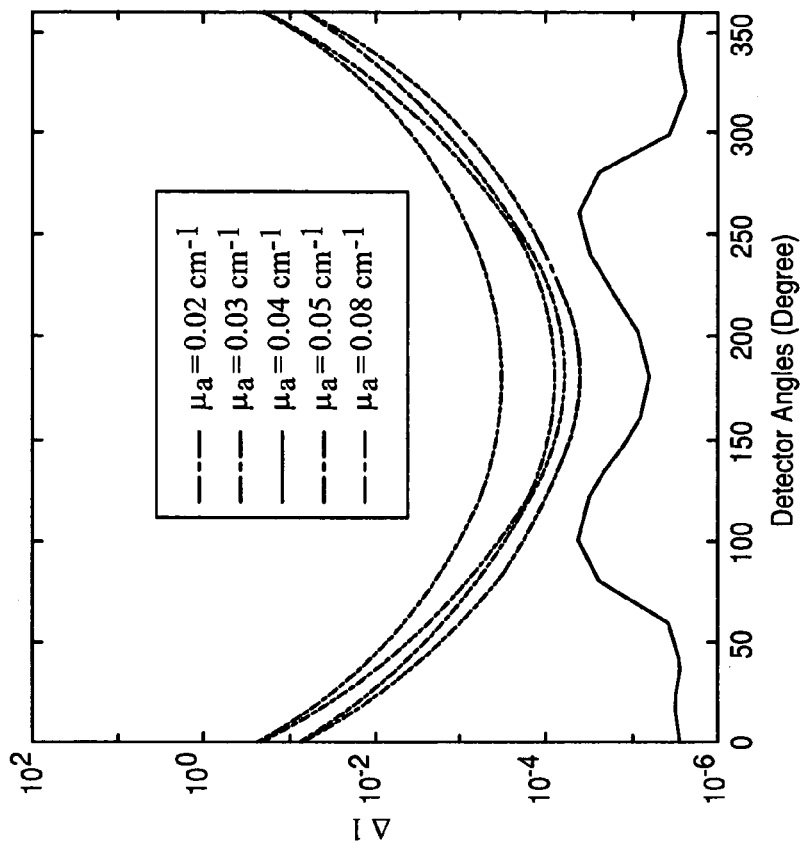
FIG. 16B is a graph plotting the amplitude of normalized intensities used in the modified perturbation formulation corresponding to the reconstructed cross-sectional images shown in column 3 of FIG. 4.
Figure 16A:
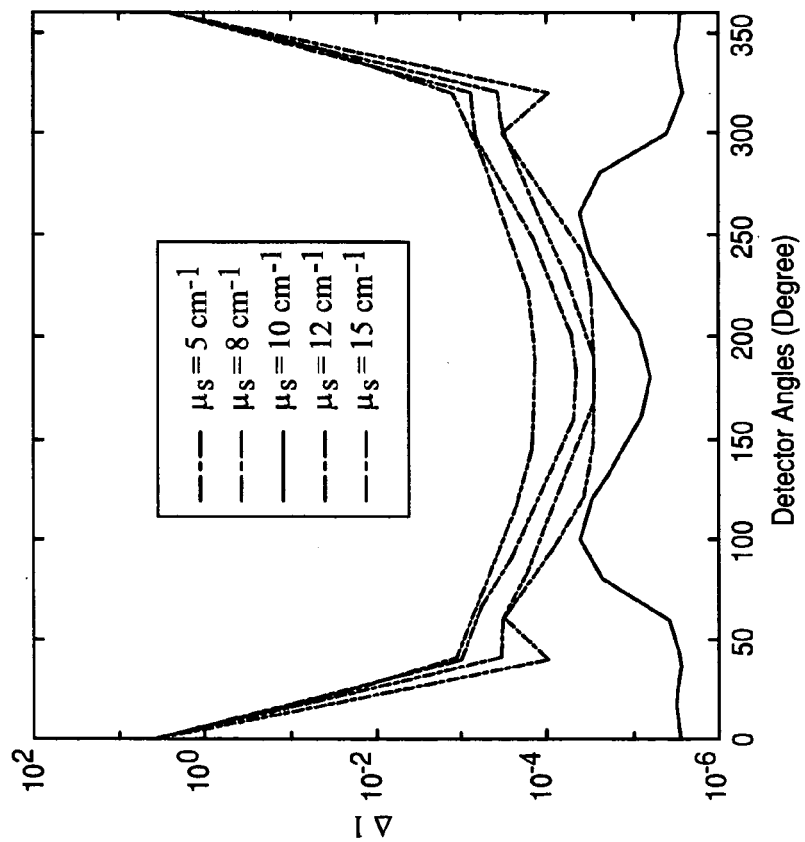
FIG. 16A is a graph plotting the amplitude of normalized intensities used in the modified perturbation formulation corresponding to the reconstructed cross-sectional images shown in row 3 of FIG. 4.
Figure 18:
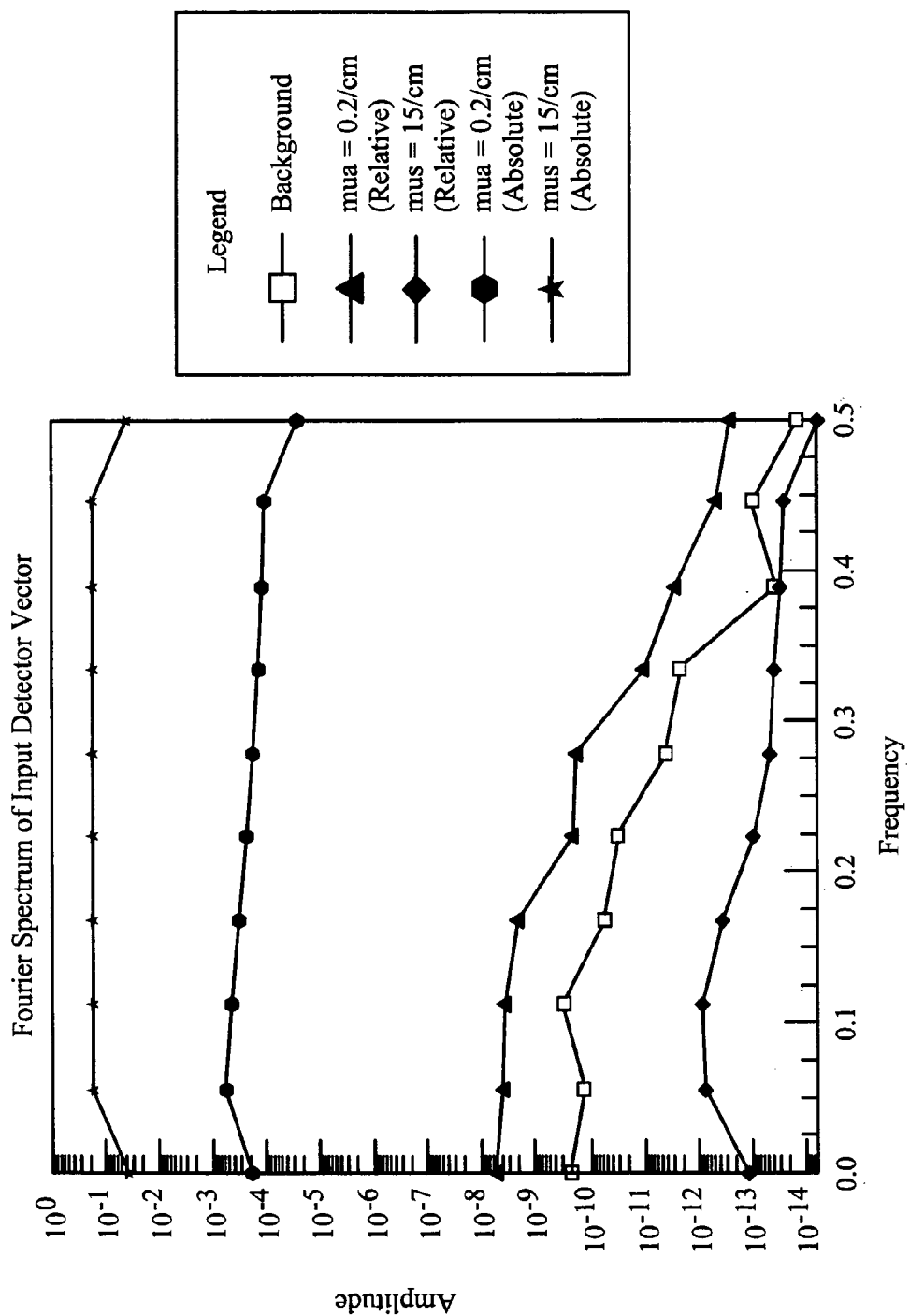
FIG. 18 is a graph plotting the amplitude of the frequency spectrum of the Fourier transforms for data vectors computed using equation (1) and equation (3)

While we have demonstrated that the described reconstruction procedure can significantly stabilize the computed reconstructions to errors in the reference medium, and that the principal origin of solution instability in its absence is the result of to errors in $I_r$, it is useful to gain further insight as to why this should occur. An important difference between the two perturbation formulations is that equation (1) computes the difference between two exponentially attenuated quantities, while equation (3) performs a linear operation on an exponentially attenuated quantity. Because of the nonlinear relationship between the medium coefficient values and surface detector responses, small errors in the former (the selected reference medium) can lead to large errors in the latter (the computed intensity or weight associated with the selected reference medium). Moreover, because the relationship is non-linear, such errors can be expected to effectively distort the information content of the resultant data vector. The occurrence of such distortion is shown in FIGS. 16 and 17. FIG. 16 shows the angle dependence of the relative detector response (i.e., the data vector) for a source bisecting the two inclusions computed using reference media corresponding to row 3 and column 3 of FIG. 5. Inspection of these plots clearly reveal a bimodal attenuation profile indicating the presence of two buried objects, a finding consistent with its actual structure. In contrast, this structure is almost completely absent from results derived using the original perturbation formulation (see FIG. 17) even though the variation in range of the reference medium is much less than that used in FIG. 16. This difference is most evident in results given in FIG. 18 that shows the amplitude of the frequency spectrum of the corresponding Fourier transforms. Comparison reveals that in the case where the selected reference medium has an error only in $\mu_a$ of 0.02 cm$^{-1}$, this produces an error of approximately 5 orders of magnitude in the amplitude of the frequency spectrum. This error grows to approximately eight orders of magnitude for the case where the selected reference medium has an error in $\mu_s$ of only 5 cm$^{-1}$. Given the magnitude of these errors, the extreme sensitivity of the reconstruction results obtained from the original perturbation equation is evident.

When we examined the computed data vector for the formulation based on equation (7), we observed a pattern similar to that shown in FIG. 16, but with much higher amplitude values. It is this close relationship that we believe accounts for why previous reconstruction results derived using equation (8) also provided stable and qualitatively accurate maps, even though the solutions lacked features important for specific interpretation and iterative updates. R. L. Barbour, H. Graber, R. Aronson, and J. Lubowski, "Model for 3-D optical imaging of tissue," Int. Geosci and Remote Sensing Symp., (IGARSS), 2, 1395–1399 (1990) (the disclosures of which are incorporated herein by reference). H. L. Graber, J. Chang, J. Lubowsky, R. Aronson and R. L. Barbour, "Near infrared absorption imaging in dense scattering media by steady-state diffusion tomography", in Proc. *Photon migration and imaging in random media and tissues"*, 1888, 372–386, (1993) (the disclosures of which are incorporated herein by reference). Y. L. Graber, J. Chang and R. L. Barbour "Imaging of multiple targets in dense scattering media", in Proc. *Experimental and numerical methods for solving ill-posed inverse problems: Medical and non-medical applications*, SPIE, 2570, 219–234, (1995) (the disclosures of which are incorporated herein by reference).

A further advantage of the current method compared to the previously described SART-Type algorithm is that we are able to directly evaluate intensity difference values for which no mismatches exist between the computed intensity values, $I_r$, and the Jacobian matrix, $W_r$. Y. L. Graber, J. Chang and R. L. Barbour "Imaging of multiple targets in dense scattering media", in Proc. *Experimental and numerical methods for solving ill-posed inverse problems: Medical and non-medical applications*, SPIE, 2570, 219–234, (1995) (the disclosures of which are incorporated herein by reference). Not only does this reduce systematic errors, but produces solutions that can be updated by iterative methods. As reported here, error analysis studies have demonstrated that the current methodology produces remarkable stable solutions having excellent qualitative accuracy.

An important goal shared by many investigators in the biomedical optics field is the capacity to accurately quantify variations in optical coefficients in tissue. One consequence of adopting the described reconstruction procedure is that the derived solution will not converge to the actual value even with error free measurement data and non-linear updates. Instead, as is evident from results shown in FIGS. 4 and 5, they will converge to a solution that is proportional to the true value throughout the image map.

Examination of the recovered values indicates that the value of this proportionality coefficient depends strongly on the selected reference medium. Interestingly, though, as shown in FIG. 19, the ratio of the computed coefficient values is nearly constant over a broad range indicating that the relative error in the coefficients is itself a constant. In fact, for the examples studied, we find that $(\delta\mu_a/\delta D)_{Reconstructed} \approx (\delta\mu_a/\delta D)^{1/2}_{Original}$ over most of the range of reference values explored. In other examples (results not shown), we have explored this relationship for a variety of perturbation values with a similar range of reference media. In all cases, a constant error in the ratio of the derived coefficients was obtained. The value of the proportionality constant, however, varied depending on the magnitude and direction of the perturbation, but remained within a relatively small range.

While it may be that case for some studies the restrictions imposed by the described method may prove limiting, it is anticipated that there are many practical situations where measurement of relative changes are nonetheless very useful. One example of special interest is in the evaluation of dynamic imaging data.

Finally, from a mathematical perspective, the described methodology has the effect of desensitizing the solution of boundary value problems to specific features of the boundary. One practical consequence of this is that, unlike the standard perturbation formulation, the current formulation is less sensitive to a detailed knowledge of the external boundary of tissue, a quantity not easily measured.

While the instant invention has considered using of DC sources, it is expressly understood that the described methodology is extendable to other source conditions (e.g., time-harmonic and time-resolved measurements) and other inverse formulations (e.g., iterative gradient descent) and is extendable to other imaging modalities including, ultrasound, radioscintigraphic and impedance imaging.

Although illustrative embodiments have been described herein in detail, those skilled in the art will appreciate that variations may be made without departing from the spirit and scope of this invention. Moreover, unless otherwise specifically stated, the terms and expressions used herein are terms of description and not terms of limitation, and are not intended to exclude any equivalents of the system and methods set forth in the following claims.

The invention claimed is:

1. A computer-implemented method for imaging of the properties of at least one scattering target medium, comprising:

generating a first vector of measured data and a second vector of measured data, the first vector being indicative of energy emerging from the at least one scattering target medium, the second vector being indicative of energy emerging from the at least one scattering target medium, the emerging energy substantially originating from at least one source directing the energy into the at least one scattering target medium;

normalizing a difference between the first and second vectors according to a ratio of: (a) a difference between the first and second vectors, to (b) the second vector;

solving a modified perturbation equation of a radiation transport inverse problem for a relative change between a known property of a reference medium and a corresponding unknown property of the at least one scattering target medium, wherein the modified perturbation equation relates the normalized difference and a vector of reference data for the known reference medium to the relative change in the property, the vector of reference data being indicative of energy emerging from the known reference medium; and generating an image of the at least one scattering target medium, responsive to the solving.

2. The computer-implemented method of claim 1 wherein energy sources and energy detectors are configured in corresponding source-detector pairs for the at least one scattering target medium and the reference medium, and the modified perturbation equation has the following form:

$$(\delta I_r)_i = \left[\frac{I_i - (I_0)_i}{(I_0)_i}\right](I_r)_i; \text{ and}$$

$$W_r \cdot \delta x = \delta I_r$$

where $\delta x$ is a vector of the relative changes between the known property of the reference medium and the corresponding unknown property of the at least one scattering target medium, $W_r$ is a weight matrix describing the influence that each of a plurality of volume elements of the reference medium has on energy emerging at a point on the reference medium;

$I_r$ is the vector of reference data;

$(I_r)_i$ is an element of $I_r$ for an ith source-detector pair of the reference medium;

$I_i$ is an element of the first vector for an ith source-detector pair of the at least one scattering target medium corresponding to the ith source-detector pair of the reference medium;

$I_0$ is the second vector;

$(I_0)_i$ is an element of $I_0$ for the ith source-detector pair of the at least one scattering target medium;

$(\delta I_r)_i$ represents a change in the vector of reference data for the ith source-detector pair of the reference medium; and $\delta I_r$ represents a change in the vector of reference data for all source-detector pairs of the reference medium.

3. The computer-implemented method of claim 1 wherein the normalizing the difference between the first and second vectors comprises determining a logarithm of ratio of the first vector to the second vector.

4. The computer-implemented method of claim 1 wherein energy sources and energy detectors are configured in corresponding source-detector pairs for the at least one scattering target medium and the reference medium, and the modified perturbation equation has the following form:

$$(\delta I')_i = \ln\frac{I_i}{(I_0)_i};$$

$$(W'_r)_{ij} = \frac{(W_r)_{ij}}{(I_r)_i};$$

$$\delta I' = W'_r \delta x$$

where $\delta x$ is a vector of the relative changes between the known property of the reference medium and the corresponding unknown property of the at least one scattering target medium, $W'_r$ is a weight matrix describing the influence that each of a plurality of volume elements of the reference medium has on energy emerging at a point on the reference medium;

$(W'_r)_{ij}$ is an element of $W'_r$ for an ith source-detector pair of the reference medium and a jth volume element of the reference medium;

$I_r$ is the vector of reference data;

$(I_r)_i$ is an element of $I_r$ for the ith source-detector pair of the reference medium;

$I_i$ is an element of the first vector for an ith source-detector pair of the at least one scattering target medium corresponding to the ith source-detector pair of the reference medium;

$I_0$ is the second vector;

$(I_0)_i$ is an element of $I_0$ for the ith source-detector pair of the at least one scattering target medium; and $\delta I'$ is a vector representing a relative difference between the first and second vectors that is mapped onto the reference medium.

5. The computer-implemented method of claim 1 wherein the unknown property which is solved for by the solving includes is at least one of an absorption coefficient and a scattering coefficient.

6. The computer-implemented method of claim 1 wherein the first and second vectors are obtained from one scattering target medium.

7. The computer-implemented method of claim 1 wherein the first and second vectors are obtained from different scattering target mediums.

8. The computer-implemented method of claim 1 wherein the first and second vectors are obtained at different time instants to provide dynamic imaging data of the at least one scattering target medium.

9. The computer-implemented method of claim 1 wherein the first vector is obtained at a first instant in time and the second vector represents a time averaged mean of a plurality of measurements.

10. The computer-implemented method of claim 1 further comprising generating a cross-sectional image representing the relative changes in the property.

11. The computer-implemented method of claim 1, wherein solving the modified perturbation equation comprises mapping the normalized difference onto the reference medium.

12. A system for imaging of the properties of at least one scattering target medium, comprising:

means for generating a first vector of measured data and a second vector of measured data, the first vector being indicative of energy emerging from the at least one scattering target medium, the second vector being indicative of energy emerging from at least one scattering target medium, the emerging energy substantially originating from at least one source directing the energy into the at least one scattering target medium;

means for normalizing a difference between the first and second vectors according to a ratio of: (a) a difference between the first and second vectors, to (b) the second vector;

means for solving a modified perturbation equation of a radiation transport inverse problem for a relative change between a known property of a reference medium and a corresponding unknown property of at least one scattering target medium, wherein the modified perturbation equation relates the normalized difference and a vector of reference data for the known reference medium to the relative change in the property, the vector of reference data being indicative of energy emerging from the known reference medium; and means for generating an image of the at least one scattering target medium, responsive to the solving.

13. The system of claim 12 wherein energy sources and energy detectors are configured in corresponding source-detector pairs for the at least one scattering target medium and the reference medium, and the modified perturbation equation has the following form:

$$(\delta I_r)_i = \left[\frac{I_i - (I_0)_i}{(I_0)_i}\right](I_r)_i; \text{ and}$$

$$W_r \cdot \delta x = \delta I_r$$

where $\delta x$ is a vector of the relative changes between the known property of the reference medium and the corresponding unknown property of the at least one scattering target medium;

$W_r$ is a weight matrix describing the influence that each of a plurality of volume elements of the reference medium has on energy emerging at a point on the reference medium;

$I_r$ is the vector of reference data;

$(I_r)_i$ is an element of $I_r$ for an ith source-detector pair of the reference medium;

$I_i$ is an element of the first vector for an ith source-detector pair of the at least one scattering target medium corresponding to the ith source-detector pair of the reference medium;

$I_0$ is the second vector;

$(I_0)_i$ is an element of $I_0$ for the ith source-detector pair of the at least one scattering target medium;

$(\delta I_r)_i$ represents a change in the vector of reference data for the ith source-detector pair of the reference medium; and $\delta I_r$ represents a change in the vector of reference data for all source-detector pairs of the reference medium.

14. The system of claim 12 wherein the normalizing of the difference between the first and second vectors comprises determining a logarithm of a ratio of the first vector to the second vector.

15. The system of claim 12 wherein energy sources and energy detectors are configured in corresponding source-detector pairs for the at least one scattering target medium and the reference medium, and the modified perturbation equation has the following form:

$$(\delta I')_i = \ln\frac{I_i}{(I_0)_i};$$

$$(W'_r)_{ij} = \frac{(W_r)_{ij}}{(I_r)_i};$$

$$\delta I' = W'_r \delta x$$

where $\delta x$ is a vector of the relative changes between the known property of the reference medium and the corresponding unknown property of the at least one scattering target medium;

$W'_r$ is a weight matrix describing the influence that each of a plurality of volume elements of the reference medium has on energy emerging at a point on the reference medium;

$(W'_r)_{ij}$ is an element of $W'_r$ for an ith source-detector pair of the reference medium and a jth volume element of the reference medium;

$I_r$ is the vector of reference data;

$(I_r)_i$ is an element of $I_r$ for the ith source-detector pair of the reference medium;

$I_i$ is an element of the first vector for an ith source-detector pair of the at least one scattering target medium corresponding to the ith source-detector pair of the reference medium;

$I_0$ is the second vector;

$(I_0)_i$ is an element of $I_0$ for the ith source-detector pair of the at least one scattering target medium; and $\delta I'$ is a vector representing a relative difference between the first and second vectors that is mapped onto the reference medium.

16. A computer-implemented method for imaging of the properties of at least one scattering target medium, wherein energy is directed into the at least one scattering target medium using a plurality of energy sources, and the energy as it emerges from the at least one scattering target medium is detected using a plurality of energy detectors, the method comprising:

generating first and second vectors of measured data responsive to readings from the energy detectors;

generating a reference vector from a reference medium that models the at least one scattering target medium, based on energy directed into the reference medium by a plurality of energy sources that model the plurality of energy sources of the at least one scattering target medium, and based on energy detected from the reference medium by a plurality of energy detectors that model the plurality of energy detectors of the at least one scattering target medium;

calculating a normalized difference between the first and second vectors of measured data according to a ratio of: (a) a difference between the first and second vectors, to (b) the second vector;

calculating a difference vector based on a product of the normalized difference and the reference vector;

solving a perturbation equation using the difference vector to obtain a vector representing a property of the at least one scattering target medium; and generating an image of the at least one scattering target medium based on the vector representing the property of the at least one scattering target medium.

17. A medium on which computer code is embodied, the computer code being executable by a computer to perform a method for imaging of the properties of at least one scattering target medium, wherein energy is directed into the at least one scattering target medium using a plurality of energy sources, and the energy as it emerges from the at least one scattering target medium is detected using a plurality of energy detectors, the method comprising:

generating first and second vectors of measured data responsive to readings from the energy detectors;

generating a reference vector from a reference medium that models the at least one scattering target medium, based on energy directed into the reference medium by a plurality of energy sources that model the plurality of energy sources of the at least one scattering target medium, and based on energy detected from the reference medium by a plurality of energy detectors that model the plurality of energy detectors of the at least one scattering target medium;

calculating a normalized difference between the first and second vectors of measured data according to a ratio of:
  (a) a difference between the first and second vectors, to
  (b) the second vector;

calculating a difference vector based on a product of the normalized difference and the reference vector;

solving a perturbation equation using the difference vector to obtain a vector representing a property of the at least one scattering target medium; and generating an image of the at least one scattering target medium based on the vector representing the property of the at least one scattering target medium.

* * * * *